US012621691B2

(12) United States Patent
Rahman et al.

(10) Patent No.: US 12,621,691 B2
(45) Date of Patent: *May 5, 2026

(54) METHOD AND APPARATUS FOR CHANNEL QUALITY REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

This patent is subject to a terminal disclaimer.

(21) Appl. No.: 18/157,795

(22) Filed: Jan. 20, 2023

(65) Prior Publication Data

US 2023/0254718 A1     Aug. 10, 2023

Related U.S. Application Data

(60) Provisional application No. 63/432,553, filed on Dec. 14, 2022, provisional application No. 63/306,844, filed on Feb. 4, 2022.

(51) Int. Cl.
*H04W 24/08*        (2009.01)
*H04L 5/00*          (2006.01)

(52) U.S. Cl.
CPC .......... *H04W 24/08* (2013.01); *H04L 5/0057* (2013.01)

(58) Field of Classification Search
None
See application file for complete search history.

(56) References Cited

U.S. PATENT DOCUMENTS

| | | |
|---|---|---|
| 2018/0042028 A1 | 2/2018 | Nam et al. |
| 2020/0084001 A1 | 3/2020 | Onggosanusi et al. |
| 2021/0143870 A1 | 5/2021 | Faxer et al. |
| 2021/0359742 A1 | 11/2021 | Mondal et al. |

(Continued)

FOREIGN PATENT DOCUMENTS

| | | | |
|---|---|---|---|
| WO | 2021146992 A1 | 7/2021 | |
| WO | 2021151241 A1 | 8/2021 | |
| WO | WO-2023026196 A1 * | 3/2023 | ........... H04B 7/0626 |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

(Continued)

*Primary Examiner* — Peter P Chau

(57) ABSTRACT

Apparatuses and methods for channel quality reporting are provided. A method for operating a user equipment (UE) includes receiving a configuration about a channel state information (CSI) report. The configuration includes information about $N_g > 1$ groups of CSI reference signal (CSI-RS) ports. The method further includes, based on the configuration, measuring the $N_g$ groups of CSI-RS ports, identifying $K \geq 1$ hypotheses for the CSI report, and determining the CSI report based on the K hypotheses. The method further includes transmitting the CSI report. The CSI report corresponds to $\upsilon \geq 1$ layers.

19 Claims, 13 Drawing Sheets

(56)         References Cited

U.S. PATENT DOCUMENTS

| | | | | |
|---|---|---|---|---|
| 2022/0140981 A1* | 5/2022 | Hindy | H04W 24/10 | |
| | | | | 370/329 |
| 2023/0062380 A1* | 3/2023 | Abdelghaffar | H04L 5/0094 | |
| 2024/0306024 A1* | 9/2024 | Matsumura | H04L 5/0035 | |
| 2024/0364400 A1* | 10/2024 | Muruganathan | H04L 5/0048 | |
| 2025/0055528 A1* | 2/2025 | Muruganathan | H04W 24/10 | |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Fraunhofer IIS, et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

International Search Report and Written Opinion issued May 16, 2023 regarding International Application No. PCT/KR2023/001549, 7 pages.

Extended European Search Report issued Feb. 25, 2025 regarding Application No. 23749969.4, 14 pages.

Ericsson, "CSI feedback for multi-TRP", 3GPP TSG-RAN WG1 #91, R1-1720974, Nov. 2017, 9 pages.

Vivo, "Views on CSI enhancement for high/medium UE velocities and coherent JT", 3GPP TSG RAN WG1 #109-e, R1-2203543, May 2022, 17 pages.

* cited by examiner

600

700

3D grid of beams in
(1$^{st}$ port dim., 2$^{nd}$ port dim., freq. dim.)

$O_3N_3$-1

Frequency dim.

2$^{nd}$ port dim.

$O_2N_2$-1

$O_1N_1$-1

1$^{st}$ port dim.

1600

Receive a configuration about a CSI report.    ~1610

Measure the $N_g$ groups of CSI-RS ports.    ~1620

Identify $K \geq 1$ hypotheses for the CSI report.    ~1630

Determine the CSI report based on the $K$ hypotheses.    ~1640

Transmit the CSI report.    ~1650

METHOD AND APPARATUS FOR CHANNEL QUALITY REPORTING

CROSS-REFERENCE TO RELATED APPLICATION AND CLAIM OF PRIORITY

This application claims priority under 35 U.S.C. § 119(e) to U.S. Provisional Patent Application No. 63/306,844 filed on Feb. 4, 2022 and U.S. Provisional Patent Application No. 63/432,553 filed on Dec. 14, 2022. The above-identified provisional patent applications are hereby incorporated by reference in their entirety.

TECHNICAL FIELD

The present disclosure relates generally to wireless communication systems and, more specifically, to channel quality reporting.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for to channel quality reporting.

In one embodiment, a user equipment (UE) is provided. The UE includes a transceiver configured to receive a configuration about a channel state information (CSI) report. The configuration includes information about $N_g>1$ groups of CSI reference signal (CSI-RS) ports. The UE further includes a processor operably coupled to the transceiver. The processor, based on the configuration, is configured to measure the $N_g$ groups of CSI-RS ports, identify $K \geq 1$ hypotheses for the CSI report, and determine the CSI report based on the K hypotheses. The transceiver is further configured to transmit the CSI report. The CSI report corresponds to $\upsilon \geq 1$ layers.

In another embodiment, a base station (BS) is provided. The BS includes a processor configured to generate a configuration about a CSI report. The configuration includes information about $N_g>1$ groups of CSI-RS ports. The BS further includes a transceiver operably coupled to the processor. The transceiver is configured to transmit the configuration, transmit CSI-RS on the $N_g$ groups of CSI-RS ports, and receive the CSI report. The CSI report corresponds to $\upsilon \geq 1$ layers and is based on $K \geq 1$ hypotheses.

In yet another embodiment, a method for operating a user equipment (UE) is provided. The method includes receiving a configuration about a channel state information (CSI) report. The configuration includes information about $N_g>1$ groups of CSI reference signal (CSI-RS) ports. The method further includes, based on the configuration, measuring the $N_g$ groups of CSI-RS ports, identifying $K \geq 1$ hypotheses for the CSI report, and determining the CSI report based on the K hypotheses. The method further includes transmitting the CSI report. The CSI report corresponds to $\upsilon \geq 1$ layers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
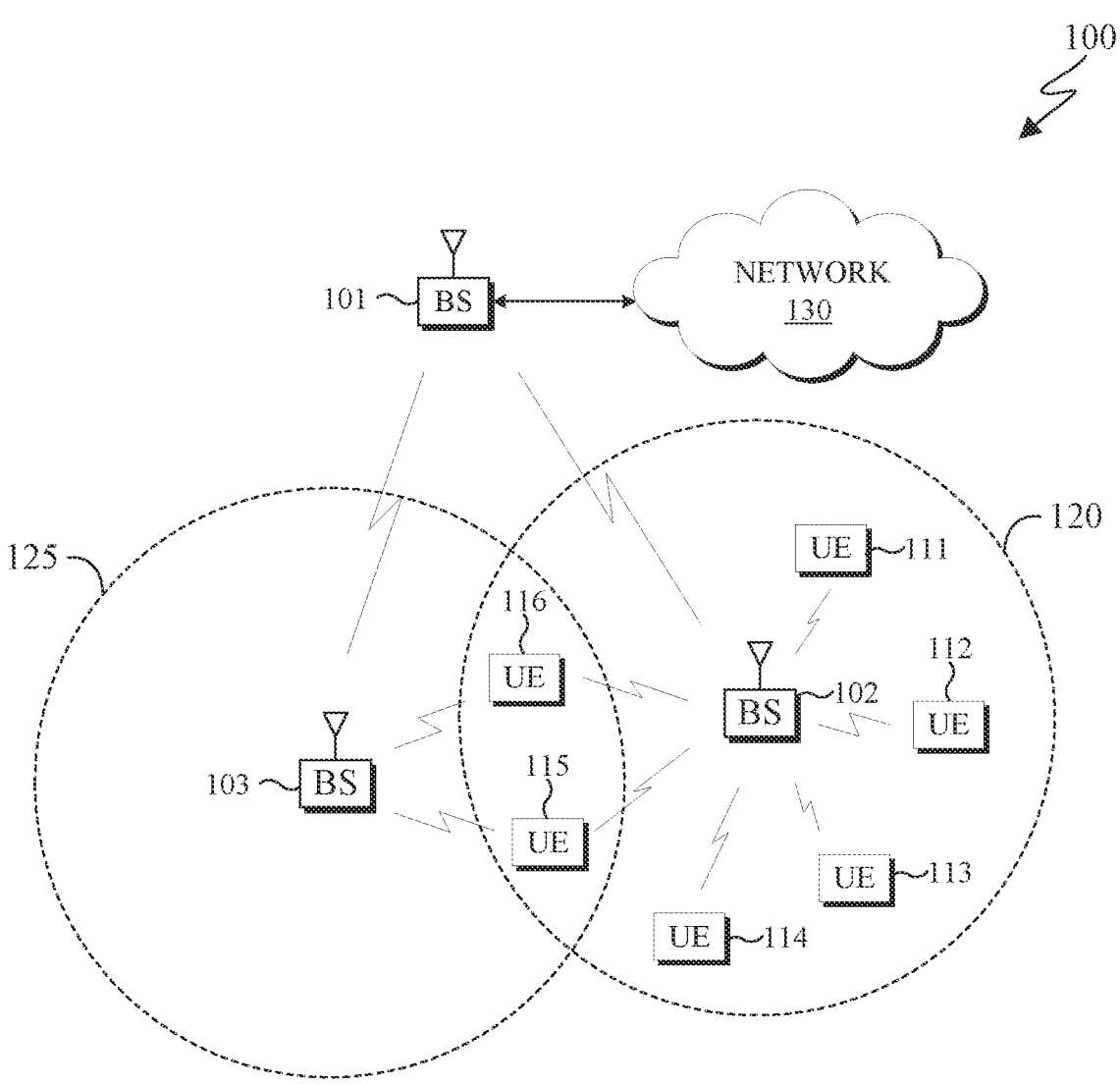
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5");

3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); 3GPP TS 38.211 v17.0.0, "E-UTRA, NR, Physical channels and modulation" (herein "REF 10")

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
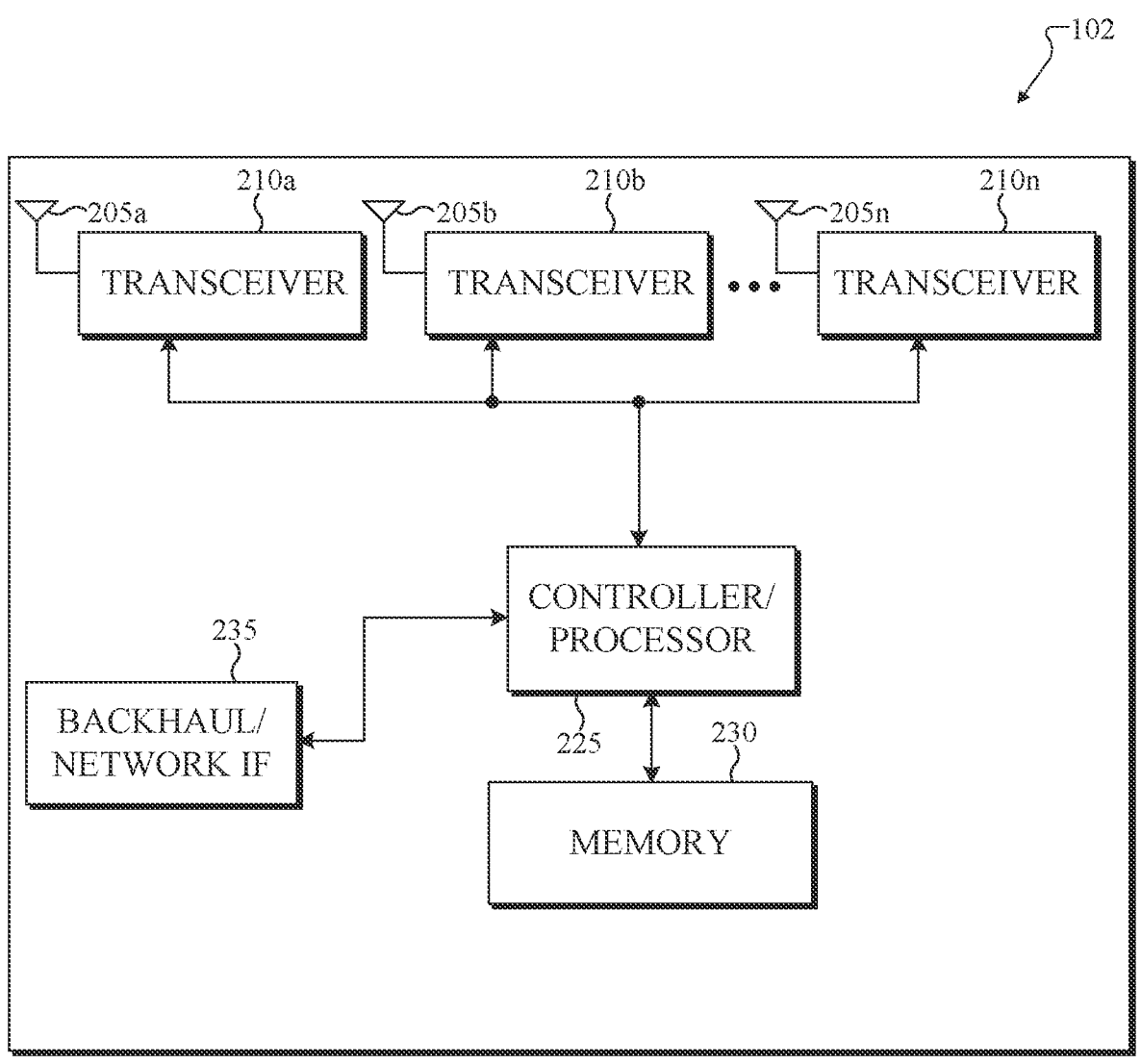
FIG. 2 illustrates an example gNB according to embodiments of the present disclosure.
Figure 3:
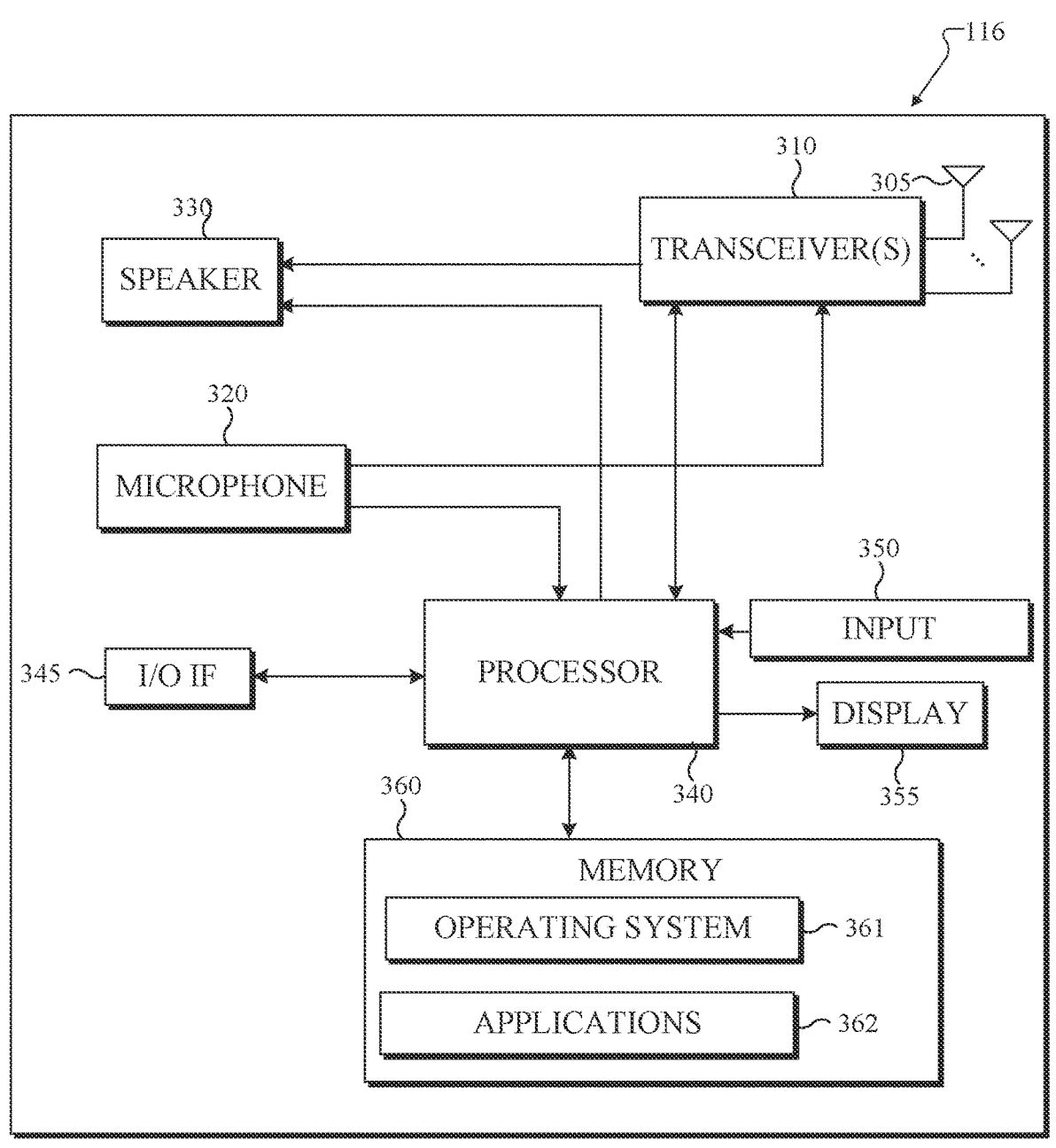
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for channel quality reporting. In certain embodiments, one or more of the BSs 101-103 include circuitry, programing, or a combination thereof for channel quality reporting.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink transmission in full duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
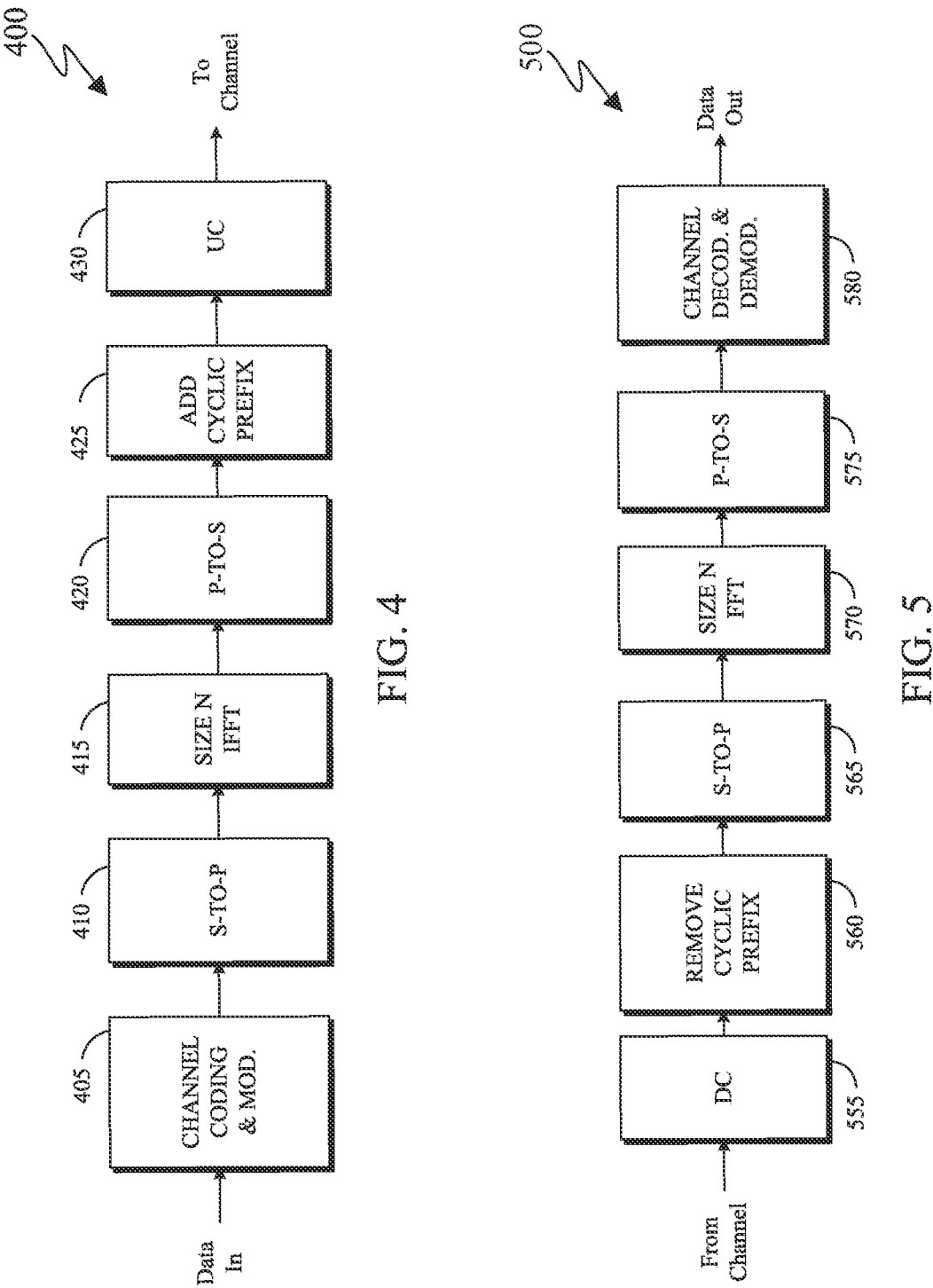
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support channel quality reporting as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the down-link from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG.

5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe symbol can be used to multiplex SRS transmissions from one or more UEs. A number of subframe symbols that are available for data/UCI/DMRS transmission is $$N_{symb} = 2 \cdot (N_{symb}^{UL} - 1) - N_{SRS},$$

where $N_{SRS}=1$ if a last subframe symbol is used to transmit SRS and $N_{SRS}=0$ otherwise.

Figure 6:
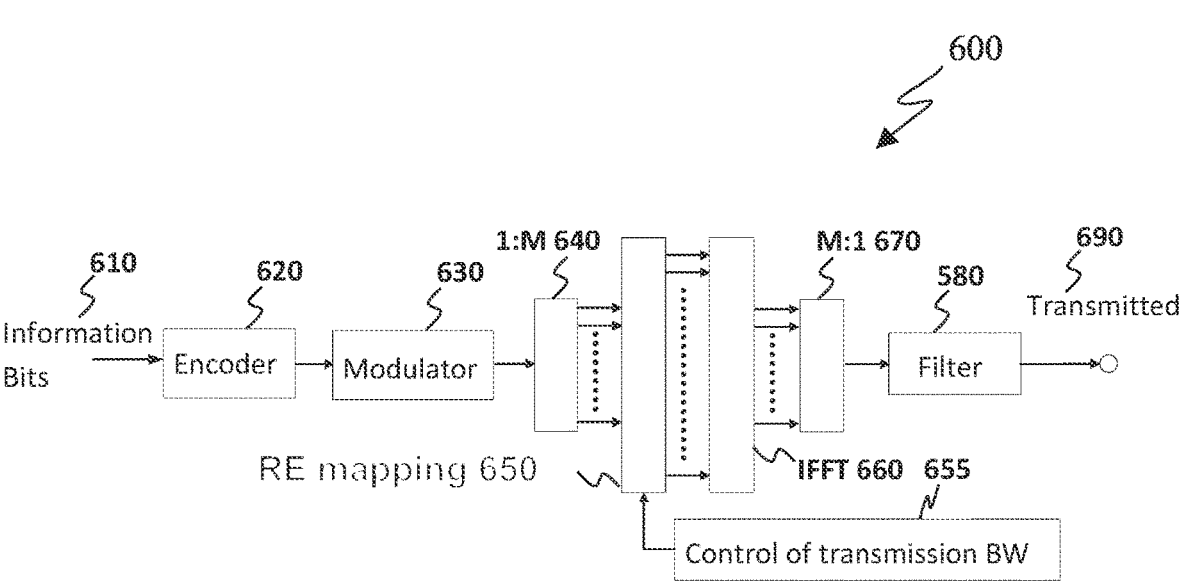
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
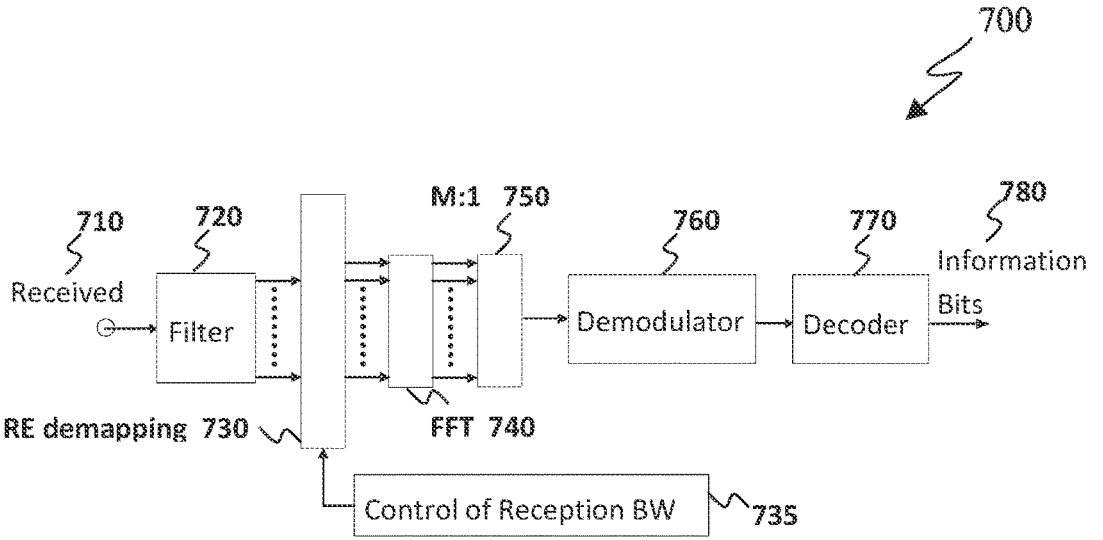
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
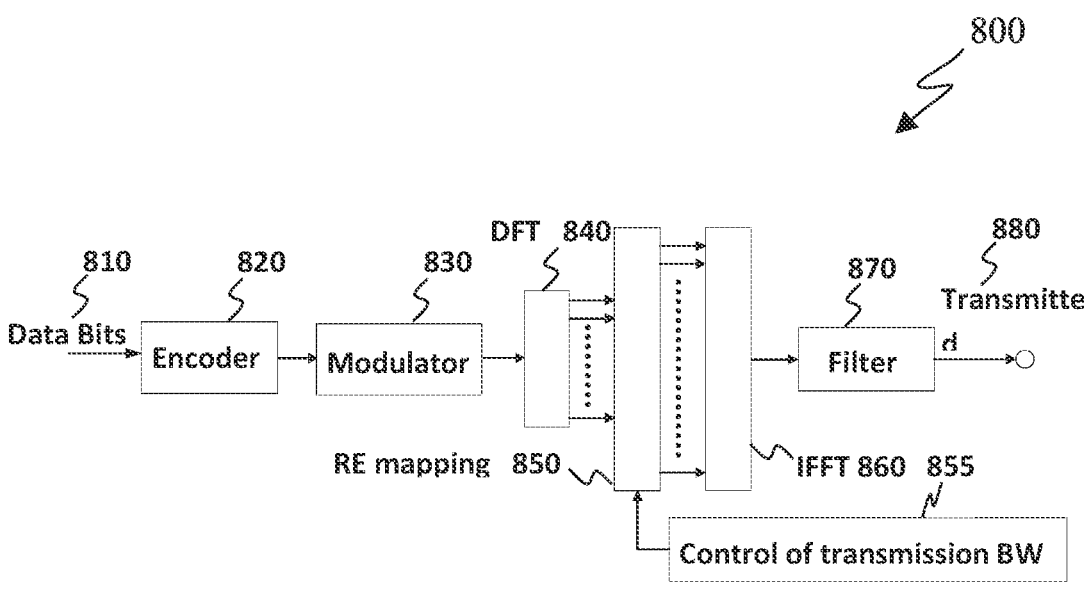
FIG. 8 illustrates a transmitter block diagram for a PUSCH in a subframe according to embodiments of the present disclosure.

FIG. 8 illustrates a transmitter block diagram 800 for a PUSCH in a subframe according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
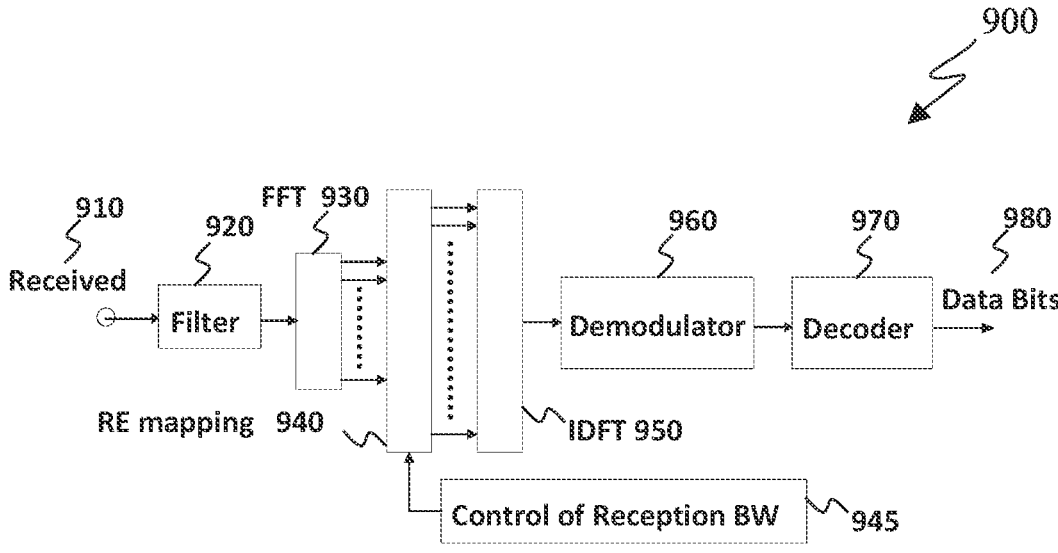
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
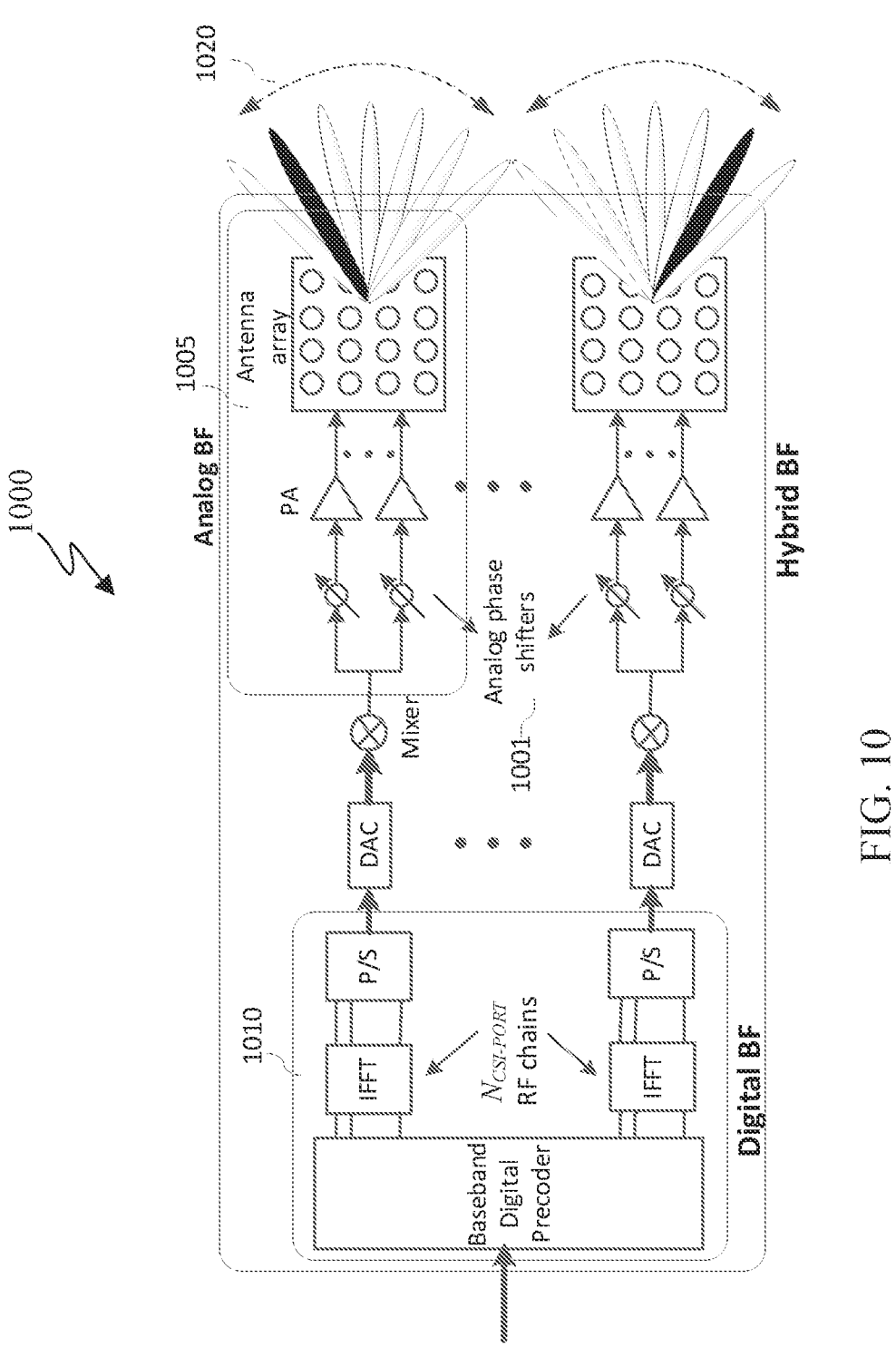
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a non-coherent joint transmission (NCJT), i.e., a layer (and precoder) of the transmission is restricted to be transmitted from only one TRP.

In Rel. 18 MIMO WID includes the following objectives on CSI enhancements:

Study, and if justified, specify enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for CJT mTRP targeting FDD and its associated CSI reporting, taking into account throughput-overhead trade-off Study, and if justified, specify CSI reporting enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis UE reporting of time-domain channel properties measured via CSI-RS for tracking The first objective extends the Rel. 17 NCJT CSI to coherent JT (CJT), and the second extends FD compression in the Rel. 16/17 codebook to include time (Doppler) domain compression. Both extensions are based on the same legacy codebook, i.e., Rel. 16/17 codebook. In this disclosure, a unified codebook design considering both extensions are provided.

Figure 11:
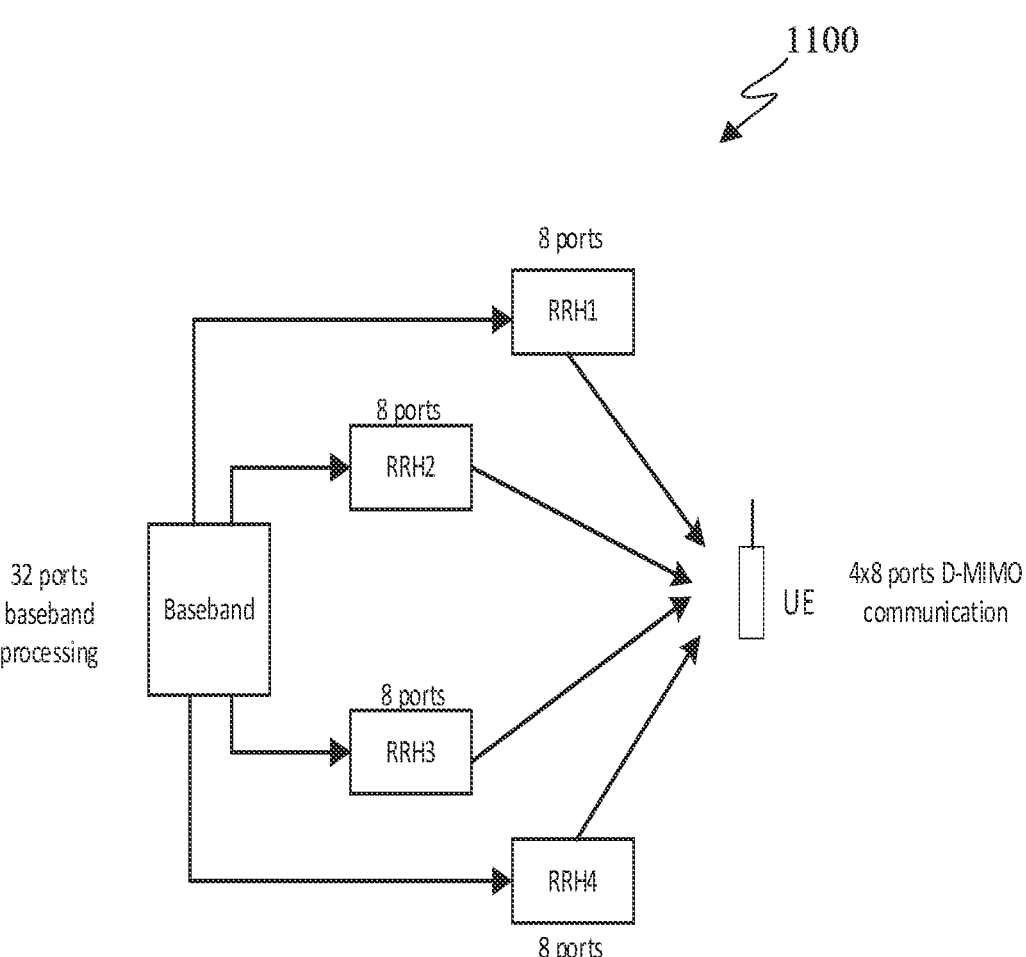
FIG. 11 illustrates a distributed MIMO system according to embodiments of the disclosure.

FIG. 11 illustrates a distributed MIMO system 1100 according to embodiments of the disclosure. The embodiment of the distributed MIMO system 1100 illustrated in FIG. 11 is for illustration only. FIG. 11 does not limit the scope of this disclosure to any particular implementation of the distributed MIMO system.

The main use case or scenario of interest for CJT/DMIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system. An example is illustrated in FIG. 11.

Figure 12:
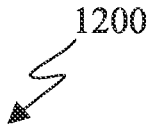
FIG. 12 illustrates channel measurement with and without Doppler components according to embodiments of the present disclosure.
Figure 12:
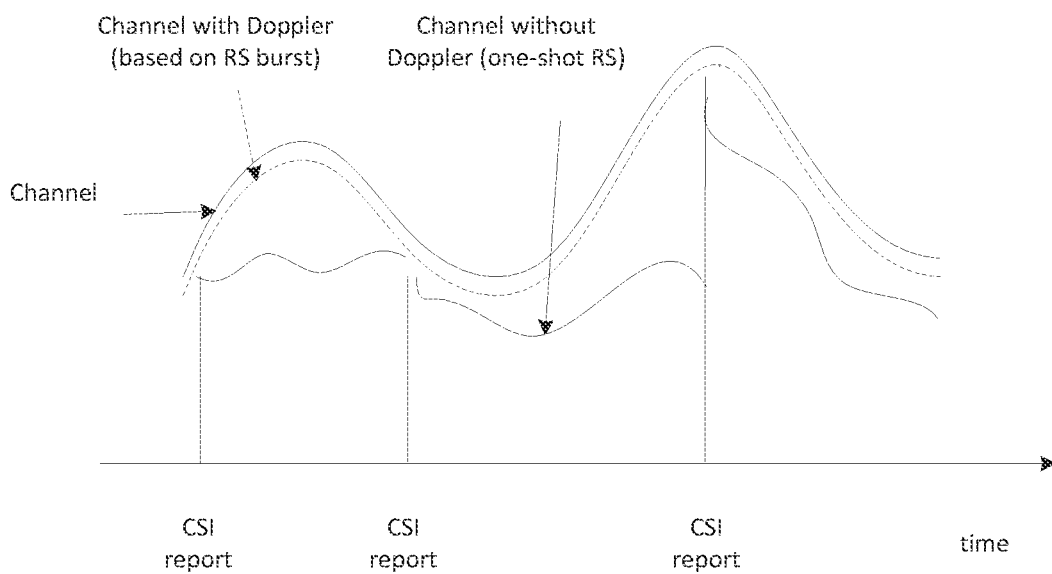

FIG. 12 illustrates channel measurement with and without Doppler components 1200 according to embodiments of the present disclosure. The embodiment of the channel measurement with and without Doppler components 1200 illustrated in FIG. 12 is for illustration only. FIG. 12 does not limit the scope of this disclosure to any particular implementation of the channel measurement with and without Doppler components.

The main use case or scenario of interest for time-/Doppler-domain compression is moderate to high mobility scenarios. When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Alternatively, the gNB can use the obtained Doppler components of the UL channel to beamform CSI-RS for CSI reporting by the UE. An illustration of channel measurement with and without Doppler components is shown in FIG. 12. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

The multiple RRHs in a D-MIMO setup can be utilized for spatial multiplexing gain (based on CSI reporting). Since RRHs are geographically separated, RRHs tend to contribute differently in CSI reporting. This motivates an enhanced CQI reporting considering dynamic RRH selection and UE mobility. This disclosure provides example embodiments on how CQI can be measured and reported under different RRH selection hypotheses and UE mobility scenarios. Additionally, the signaling details of such a CQI reporting are also provided.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \leq N$ CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 13:
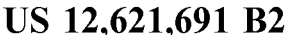
FIG. 13 illustrates an example antenna port layout according to embodiments of the present disclosure.
Figure 13:
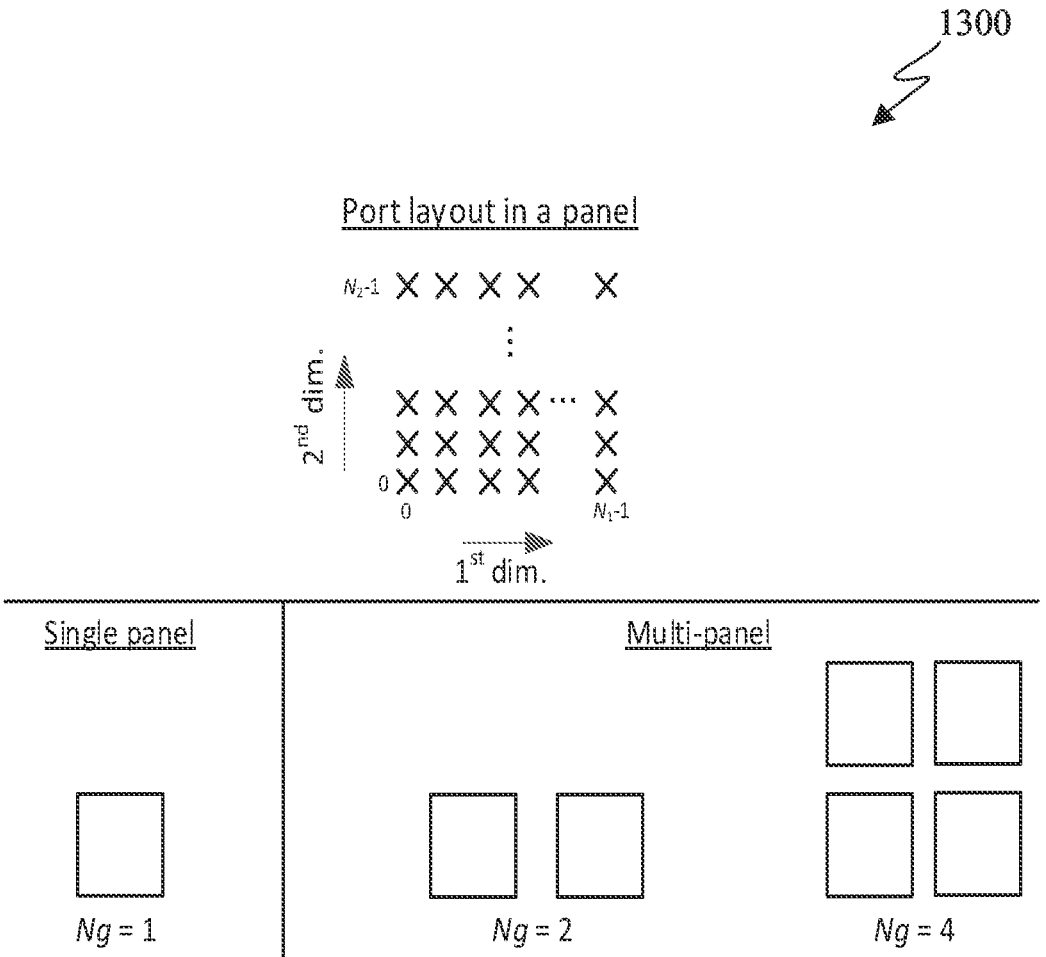

FIG. 13 illustrates an example antenna port layout 1300 according to embodiments of the present disclosure. The embodiment of the antenna port layout 1300 illustrated in FIG. 13 is for illustration only. FIG. 13 does not limit the scope of this disclosure to any particular implementation of the antenna port layout.

As illustrated in FIG. 13, $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. Therefore, for a dual-polarized antenna port layout, the total number of antenna ports is $2N_1N_2$ when each antenna maps to an antenna port. An illustration is shown in FIG. 13 where "X" represents two antenna polarizations. In this disclosure, the term "polarization" refers to a group of antenna ports. For example, antenna ports j=X+0, X+1, . . . , $$ X + \frac{P_{CSIRS}}{2} - 1 $$

comprise a first antenna polarization, and antenna ports $$ j = X + \frac{P_{CSIRS}}{2}, X + \frac{P_{CSIRS}}{2} + 1, \dots, X + P_{CSIRS} - 1 $$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g > 1$), we assume that each panel is dual-polarized antenna ports with $N_1$ and $N_2$ ports in two dimensions. This is illustrated in FIG. 13. Note that the antenna port layouts may or may not be the same in different antenna panels.

In one example, the antenna architecture of a D-MIMO or CJT system is structured. For example, the antenna structure at each RRH (or TRP) is dual-polarized (single or multi-panel as shown in FIG. 13. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g = N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

We assume a structured antenna architecture in the rest of the disclosure. For simplicity, we assume each RRH/TRP is equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, it can be implicit.

a. In one example, when implicit, it could be based on the value of K. For example, when K>1 CSI-RS resources, an RRH corresponds to one or more examples described above, and when K=1 CSI-RS resource, an RRH corresponds to one or more examples described above.

b. In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when RRH or TRP maps (or corresponds to) a CSI-RS resource or resource group, and a UE can select a subset of RRHs (resources or resource groups) and report the CSI for the selected RRHs (resources or resource groups), the selected RRHs can be reported via an indicator. For example, the indicator can be a CRI or a PMI (component) or a new indicator.

In one example, when RRH maps (or corresponds to) a CSI-RS port group, and a UE can select a subset of RRHs (port groups) and report the CSI for the selected RRHs (port groups), the selected RRHs can be reported via an indicator. For example, the indicator can be a CRI or a PMI (component) or a new indicator.

In one example, when multiple (K>1) CSI-RS resources are configured for $N_{RRH}$ RRHs, a decoupled (modular) codebook is used/configured, and when a single (K=1) CSI-RS resource for $N_{RRH}$ RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 14:
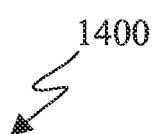
FIG. 14 illustrates a 3D grid of oversampled discrete Fourier transform (DFT) beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_lB^H = [\,a_0 \quad a_1 \quad \cdots \quad a_{L-1}\,]\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \quad \text{(Eq. 1)}$$

-continued $$[ b_0 \quad b_1 \quad \dots \quad b_{M-1} ]^H =$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 & a_1 & \dots & a_{L-1} & & & & 0 \\ & & 0 & & a_0 & a_1 & \dots & a_{L-1} \end{bmatrix} \quad \text{(Eq. 2)}$$

$$\begin{bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{bmatrix} [ b_0 \quad b_1 \quad \dots \quad b_{M-1} ]^H =$$

$$\begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where
    $N_1$ is a number of antenna ports in a first antenna port dimension (having the same antenna polarization),
    $N_2$ is a number of antenna ports in a second antenna port dimension (having the same antenna polarization),
    $P_{CSI-RS}$ is a number of CSI-RS ports configured to the UE,
    $N_3$ is a number of SBs for PMI reporting or number of FD units or number of FD components (that comprise the CSI reporting band) or a total number of precoding matrices indicated by the PMI (one for each FD unit/component),
    $a_i$ is a $2N_1N_2 \times 1$ (Eq. 1) or $N_1N_2 \times 1$ (Eq. 2) column vector, or $a_i$ is a $P_{CSIRS} \times 1$ (Eq. 1) or $$\frac{P_{CSIRS}}{2} \times 1$$

port selection column vector, where a port selection vector is a defined as a vector which contains a value of 1 in one element and zeros elsewhere
    $b_f$ is a $N_3 \times 1$ column vector,
    $c_{l,i,f}$ is a complex coefficient.
    In a variation, when the UE reports a subset $K < 2LM$ coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$, where
    $x_{l,i,f} = 1$ if the coefficient $c_{l,i,f}$ is reported by the UE according to some embodiments of this disclosure.
    $x_{l,i,f} = 0$ otherwise (i.e., $c_{l,i,f}$ is not reported by the UE).
    The indication whether $x_{l,i,f} = 1$ or 0 is according to some embodiments of this disclosure. For example, it can be via a bitmap.
    In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \quad \text{(Eq. 3)}$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \le M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [ W^1 \quad W^2 \quad \dots \quad W^R ].$$

Eq. 2 is assumed in the rest of the disclosure. The embodiments of the disclosure, however, are general and are also application to Eq. 1, Eq. 3 and Eq. 4.

Here $$L \le \frac{P_{CSI-RS}}{2} \text{ and } M \le N_3. \text{ If } L = \frac{P_{CSI-RS}}{2},$$

then A is an identity matrix, and hence not reported. Likewise, if $M=N_3$, then B is an identity matrix, and hence not reported. Assuming $M < N_3$, in an example, to report columns of B, the oversampled DFT codebook is used. For instance, $b_f = w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \dots & e^{j\frac{2\pi \cdot (N_3-1)n_{3,l}^{(f)}}{O_3 N_3}} \end{bmatrix}^T.$$

When $O_3=1$, the FD basis vector for layer $l \in \{1, \dots, \upsilon\}$ (where $\upsilon$ is the RI or rank value) is given by $$w_f = \begin{bmatrix} y_{0,l}^{(f)} & y_{1,l}^{(f)} & \dots & y_{N_3-1,l}^{(f)} \end{bmatrix}^T,$$

where $$y_{t,l}^{(f)} = e^{j\frac{2\pi t n_{3,l}^{(f)}}{N_3}} \text{ and } n_{3,l} = \begin{bmatrix} n_{3,l}^{(0)}, \dots, n_{3,l}^{(M-1)} \end{bmatrix}$$

where $$n_{3,l}^{(f)} \in \{0, 1, \dots, N_3 - 1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \dfrac{1}{\sqrt{K}}, & n = 0 \\[2ex] \sqrt{\dfrac{2}{K}} \cos\dfrac{\pi(2m+1)n}{2K}, & n = 1, \dots K-1 \end{cases},$$

and $K=N_3$, and m=0, . . . , $N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad \text{(Eq. 5)}$$

where $A = W_1$ corresponds to the Rel. 15 $W_1$ in Type II CSI codebook [REF8], and $B = W_f$.

The $C_l = \tilde{W}_2$ matrix includes all the required linear combination coefficients (e.g., amplitude and phase or real or imaginary). Each reported coefficient $(c_{l,i,f} = p_{l,i,f} \phi_{l,i,f})$ in $\tilde{W}_2$ is quantized as amplitude coefficient $(p_{l,i,f})$ and phase coefficient $(\phi_{l,i,f})$. In one example, the amplitude coefficient $(p_{l,i,f})$ is reported using a A-bit amplitude codebook where A belongs to $\{2, 3, 4\}$. If multiple values for A are supported, then one value is configured via higher layer signaling. In another example, the amplitude coefficient $(p_{l,i,f})$ is reported as $$p_{l,i,f} = p_{l,i,f}^{(1)} p_{l,i,f}^{(2)}$$

where $$p_{l,i,f}^{(1)}$$

is a reference or first amplitude which is reported using an A1-bit amplitude codebook where A1 belongs to $\{2, 3, 4\}$, and $$p_{l,i,f}^{(2)}$$

is a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \le K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ a. A X-bit indicator for the strongest coefficient index $(i^*, f^*)$, where $X = \lceil \log_2 K_{NZ} \rceil$ or $\lceil \log_2 2L \rceil$.

i. Strongest coefficient $c_{l,i^*,f^*} = 1$ (hence its amplitude/phase are not reported)

b. Two antenna polarization-specific reference amplitudes are used.

i. For the polarization associated with the strongest coefficient $c_{l,i^*,f^*} = 1$, since the reference amplitude $$p_{l,i,f}^{(2)} = 1,$$

it is not reported ii. For the other polarization, reference amplitude $$p_{l,i,f}^{(1)}$$

is quantized to 4 bits

1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

c. For $\{c_{l,i,f}, (i, f) \neq (i^*, f^*)\}$:

i. For each polarization, differential amplitudes $$p_{l,i,f}^{(2)}$$

of the coefficients calculated relative to the associated polarization-specific reference amplitude and quantized to 3 bits 1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $$p_{l,i,f}^{(1)} \times p_{l,i,f}^{(2)}$$

ii. Each phase is quantized to either 8PSK ($N_{ph}=8$) or 16PSK ($N_{ph}=16$) (which is configurable).

For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $$p_{l,i,f}^{(1)} = p_{l,r}^{(1)} = 1.$$

For the other polarization $r \in \{0,1\}$ and $r \neq r^*$, we have $$r = \left( \left\lfloor \frac{i^*}{L} \right\rfloor + 1 \right)$$

mod 2 and the reference amplitude $$p_{l,i,f}^{(1)} = p_{l,r}^{(1)}$$

is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from {1,2} and p is higher-layer configured from $$\left\{ \frac{1}{4}, \frac{1}{2} \right\}.$$

In one example, the p value is higher-layer configured for rank 1-2 CSI reporting. For rank >2 (e.g., rank 3-4), the p value (denoted by $v_0$) can be different. In one example, for rank 1-4, $(p, v_0)$ is jointly configured from $$\left\{ \left( \frac{1}{2}, \frac{1}{4} \right), \left( \frac{1}{4}, \frac{1}{4} \right), \left( \frac{1}{4}, \frac{1}{8} \right) \right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_v$ to show its dependence on the rank value $v$, hence p is replaced with $p_v$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{1, \ldots, v\}$ of a rank v CSI reporting. Alternatively, a UE can be configured to report $M_v$ FD basis vectors in two-step as follows.

In step 1, an intermediate set (InS) comprising $N'_3 < N_3$ basis vectors is selected/reported, wherein the InS is common for all layers.

In step 2, for each layer $l \in \{1, \ldots, v\}$ of a rank $v$ CSI reporting, $M_v$ FD basis vectors are selected/reported freely (independently) from $$N'_3$$

basis vectors in the InS.

In one example, one-step method is used when $N_3 \leq 19$ and two-step method is used when $N_3 > 19$. In one example, $$N'_3 = \lceil \alpha M_v \rceil$$

where $\alpha > 1$ is either fixed (to 2 for example) or configurable.

The codebook parameters used in the DFT based frequency domain compression (Eq. 5) are (L, $p_v$ for $v \in \{1,2\}$, $p_v$ for $v \in \{3,4\}$, $\beta$, $\alpha$, $N_{ph}$). The set of values for these codebook parameters are as follows.

L: the set of values is {2,4} in general, except L∈{2,4,6} for rank 1-2, 32 CSI-RS antenna ports, and R=1.

$(p_v$ for $v \in \{1,2\}$, $p_v$ for $v \in \{3,4\}) \in$ $$\left\{ \left( \frac{1}{2}, \frac{1}{4} \right), \left( \frac{1}{4}, \frac{1}{4} \right), \left( \frac{1}{4}, \frac{1}{8} \right) \right\}.$$

$\beta \in$ $$\left\{ \frac{1}{4}, \frac{1}{2}, \frac{3}{4} \right\}.$$

$\alpha = 2$
$N_{ph} = 16$.
The set of values for these codebook parameters are as in Table 1

TABLE 1

| paramCombination | L | $p_v$ $v \in \{1, 2\}$ | $p_v$ $v \in \{3, 4\}$ | $\beta$ |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

In Rel. 17 (further enhanced Type II port selecting codebook), M∈{1,2}, $$L = \frac{K_1}{2}$$

where $K_1 = \alpha \times P_{CSIRS}$, and codebook parameters (M, $\alpha$, $\beta$) are configured from Table 2.

TABLE 2

| paramCombination-r17 | M | $\alpha$ | $\beta$ |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4 |

The above-mentioned framework (Eq. 5) represents the precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H \qquad \text{(Eq. 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (Eq. 5) and space-time (Eq. 5A) frameworks.

In this disclosure, the abovementioned framework for CSI reporting based on space-frequency compression (Eq. 5) or space-time compression (Eq. 5A) frameworks can be extended in two directions:

time or Doppler domain compression (e.g., for moderate to high mobility UEs) and joint transmission across multiple RRHs/TRP (e.g., for a DMIMO or multiple TRP systems).

Figure 15A:
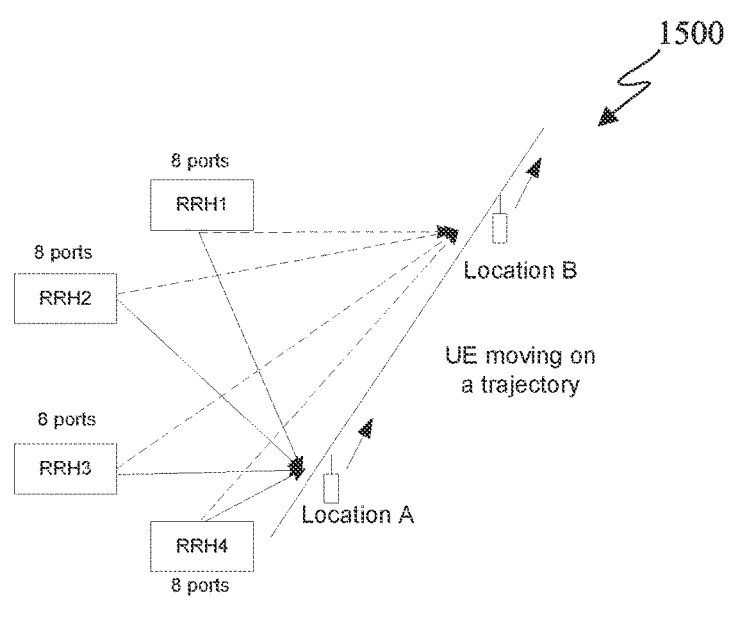
FIG. 15A illustrates a UE moving on a linear trajectory in a distributed multiple-input multiple-output (DMIMO) system according to embodiments of the present disclosure.

FIG. 15A illustrates a UE moving on a linear trajectory in a DMIMO system 1500 according to embodiments of the present disclosure. The embodiment of the UE moving on a linear trajectory in a DMIMO system 1500 illustrated in FIG. 15A is for illustration only. FIG. 15A does not limit the scope of this disclosure to any particular implementation of the UE moving on a linear trajectory in a DMIMO system.

While the UE moves from a location A to another location B at high speed (e.g., 60 kmph), the UE measures the channel and the interference (e.g., via NZP CSI-RS resources and CSI-IM resources, respectively), uses them to determine/report CSI considering CJT from multiple RRHs. The reported CSI can be based on a codebook, which includes components considering both multiple RRHs, and time-/Doppler-domain channel compression.

In the following, a granularity of CQI reporting across TRPs/RRHs (e.g., multiple NZP CSI-RS resources) is referred to as a spatial-domain (SD) granularity of CQI reporting, a granularity of CQI reporting across SBs is referred to as a frequency-domain (FD) granularity of CQI reporting, and a granularity of CQI reporting across time is referred to as a time-domain (TD) granularity of CQI reporting. In one example, the granularity of a quantity refers to how many (one or multiple) values of the quantity is reported.

Also, a CJT CSI refers to coherent joint transmission (CJT) assumption wherein the CSI is based on the assumption that antenna ports across TRPs/RRHs can be combined coherently to transmit a layer of the transmission. Likewise, a NCJT CSI refers to non-coherent joint transmission (CJT) assumption wherein the CSI is based on the assumption that antenna ports across TRPs/RRHs cannot be combined coherently to transmit a layer of the transmission. In CJT, a precoder for a layer includes non-zero entries for all TRPs the CSI is determined for, and in NCJT, a precoder for a layer includes non-zero entries for only TRP the CSI is determined for, the rest of the entries of the precoder are set to 0.

In one embodiment. a UE is configured with a CSI reporting (e.g., via higher layer CSI-ReportConfig that includes a parameter reportQuantity that provides a content of the CSI report where the content includes CQI) for $N_{RRH}>1$ RRHs/TRPs or $N_{RRH}\geq1$ RRHs/TRPs.

In one example, at least one of the following examples is used/configured regarding the FD granularity of CQI reporting across SBs (within the CSI reporting band).

In one example, the FD granularity is wideband (WB), i.e., one CQI value is reported for the entire CSI reporting band or for all SBs in the CSI reporting band.

In one example, the FD granularity is SB, i.e., one CQI value is reported for each SB in the CSI reporting.

In one example, the FD granularity is WB+SB (differential reporting) or SB w.r.t. a WB reference value. That is, one WB CQI value is reported, and one differential SB CQI value is reported for each SB in the CSI reporting, where each differential CQI value is w.r.t. the WB CQI value.

In one example, the FD granularity is fixed as described above. In one example, one of the above examples is configured via higher layer parameter cqiFormatIndicator. In one example, cqiFormatIndicator takes a value from {WB, SB}, where WB and SB each correspond to one or more examples described above.

In one example, the FD granularity is reported by the UE. This reporting can be via UE capability reporting, wherein the UE reports the one or multiple FD granularities that it supports (when configured, the FD granularity is configured subject to the UE capability reporting). Alternatively, this reporting can be via a CSI report (either separate or together with another CSI report). In this case, a two-part UCI can be used and an information about the FD granularity is included in UCI part 1.

In one example, the number of CQIs across FD SBs (denote as $X_{FD}$) is configured. When $X_{FD}=1$, the CQI across SBs is according to one or more examples described herein. When $X_{FD}>1$, the CQI across SBs is according to one or more examples described herein.

In one example, at least one of the following examples is used/configured regarding the SD granularity of CQI reporting across TRPs/RRHs.

In one example, the SD granularity is RRH-common (similar to WB), i.e., one CQI value is reported across all RRHs/TRPs.

In one example, the SD granularity is RRH-specific (similar to SB), i.e., one value is reported for each TRP. So, $N_{RRH}$ values are reported in total. In one example, one joint indicator indicates multiple values, each is a CQI value for an RRH/TRP. So, there is one joint indicator reporting multiple CQI values. In one example, there is a separate indicator indicating a CQI value for each RRH.

In one example, the SD granularity is RRH-common+RRH-specific (similar to WB+SB) or RRH-specific w.r.t. a RRH-common reference value. That is, one RRH-common CQI value is reported, and one differential RRH-specific CQI value is reported for each RRH/TRP, where each differential CQI value is w.r.t. the RRH-common CQI value. So, $1+N_{RRH}$ values are reported in total. In one example, multiple RRH-specific CQI values are reported via a single (joint) indicator or multiple indicators, as explained in previous example.

In one example, the SD granularity is fixed. In one example, one of the above examples is configured via higher layer parameter cqiFormatIndicator or a new indicator such as cqiFormatIndicatorSD. In one example, cqiFormatIndicator or cqiFormatIndicatorSD takes a value from {RRH-common, RRH-specific}, where RRH-common corresponds to one or more examples described above and RRH-specific corresponds to one or more examples described above.

In one example, the SD granularity is reported by the UE. This reporting can be via UE capability reporting, wherein the UE reports the one or multiple SD granularities that it supports (when configured, the SD granularity is configured subject to the UE capability reporting). Alternatively, this reporting can be via a CSI report (either separate or together with another CSI report). In this case, a two-part UCI can be used and an information about the SD granularity is included in UCI part 1.

In one example, RRH-common CQI value assumes a coherent joint transmission (CJT) across RRHs. In one example, RRH-specific CQI value assumes a separate transmission from each CC.

In one example, the number of CQIs across SD TRPs (denote as $X_{SD}$) is configured. When $X_{SD}=1$, the CQI across TRPs is according to one or more examples described herein. When $X_{SD}>1$, the CQI across TRPs is according to one or more examples described herein.

In one example, at least one of the following examples is used/configured regarding the FD granularity of CQI reporting across SBs (within the CSI reporting band) and the SD granularity of CQI reporting across TRPs/RRHs.

In one example, the FD and SD granularities are separate. In particular, the FD granularity is according to one or more examples described above, and the SD granularity is according to one or more examples described above, where a and b belong to {1,2, 3}.

When (a,b)=(1,1), only one CQI value is reported.

When (a,b)=(1,2), $N_{RRH}$ CQI values are reported, each is a WB CQI for an RRH.

When (a,b)=(1,3), $1+N_{RRH}$ CQI values are reported, 1 CQI value is a reference, and $N_{RRH}$ CQI values are differential WB CQI values (w.r.t. the reference) for $N_{RRH}$ RRHs.

When (a,b)=(2,1), $N_{SB}$ CQI values are reported, where $N_{SB}$ is the number of SBs. One CQI value is reported for each SB, which is common across all RRHs.

When (a,b)=(2,2), $N_{SB}N_{RRH}$ CQI values are reported, each is a SB CQI for an RRH.

When (a,b)=(2,3), $N_{SB}(1+N_{RRH})$ CQI values are reported. For each SB, one value is a reference, and $N_{RRH}$ CQI values are differential SB CQI values (w.r.t. the reference) for $N_{RRH}$ RRHs.

When (a,b)=(3,1), $(1+N_{SB})$ CQI values are reported. One reference value is reported, and one CQI value w.r.t to the reference is reported for each SB. The reference and differential values are common across all RRHs.

When (a,b)=(3,2), $(1+N_{SB})N_{RRH}$ CQI values are reported. For each RRH, one reference value is reported, and SB CQI w.r.t. the reference is reported.

When (a,b)=(3,3), $(1+N_{SB})(1+N_{RRH})$ CQI values are reported. There are two references, one for SD and one for SD. For each SB and RRH, one CQI value is reported (w.r.t. both references).

In one example, FD and SD granularities are fixed as described in one or more examples above.

In one example, FD granularity is fixed, and SD granularity is configured via cqiFormatIndicator as described in one or more examples above.

In one example, SD granularity is fixed, and FD granularity is configured via cqiFormatIndicator, as described in one or more examples above.

In one example, FD and SD granularities are configured. In one example, the configuration is via two separate higher layer parameters, namely cqiFormatIndicator for FD and cqiFormatIndicatorSD for SD. In one example, this configuration is via a joint parameter, e.g., namely cqiFormatIndicator indicating one pair of values (x,y), x for SD and y for TD.

In one example, one or both of FD and SD granularities are reported by the UE. This reporting can be via UE capability reporting, wherein the UE reports the one or multiple FD and/or SD granularities that it supports (when configured, the FD and/or SD granularities is/are configured subject to the UE capability reporting). Alternatively, this reporting can be via a CSI report (either separate or together with another CSI report). In this case, a two-part UCI can be used and an information about the FD and/or SD granularities is included in UCI part 1.

In one example, the number of CQIs across FD SBs (denote as $X_{FD}$) is configured. When $X_{FD}=1$, the CQI across SBs is according to one or more examples described herein. When $X_{FD}>1$, the CQI across SBs is according to one or more examples described herein. In one example, the number of CQIs across SD TRPs (denote as $X_{SD}$) is configured. When $X_{SD}=1$, the CQI across TRPs is according to one or more examples described herein. When $X_{SD}>1$, the CQI across TRPs is according to one or more examples described herein.

In one example, the FD and SD granularities are joint across SBs and RRHs.

In one example, the joint granularity corresponds (SD, FD)-common, i.e., only one value is reported across all SBs and RRHs.

In one example, the joint granularity corresponds (SD, FD)-specific, i.e., one value is reported for each (SB, RRH) pair.

In one example, the joint granularity corresponds (SD, FD)-differential, i.e., one reference value is reported, one (differential) value w.r.t. the reference is reported for each (SB, RRH) pair.

In one example, the joint (SD, FD) granularity is fixed as described above. In one example, one of the above examples is configured via higher layer parameter cqiFormatIndicator. In one example, cqiFormatIndicator takes a value from {(SD, FD)-common, (SD, FD)-differential}.

In one example, the joint (SD, FD) granularity is reported by the UE. This reporting can be via UE capability reporting, wherein the UE reports the one or multiple joint (SD, FD) granularities that it supports (when configured, the joint (SD, FD) granularity is configured subject to the UE capability reporting). Alternatively, this reporting can be via a CSI report (either separate or together with another CSI report). In this case, a two-part UCI can be used and an information about the joint (SD, FD) granularity is included in UCI part 1.

In one example, the number of CQIs joint across SD and FD (denote as $X_{SD-FD}$) is configured. When $X_{SD-FD}=1$, the CQI is according to one or more examples described herein. When $X_{SD-FD}>1$, the CQI is according to one or more examples described herein.

In one embodiment, one or multiple CQI values are reported across $N_{RRH}>1$ TRPs/RRHs (i.e., the SD granularity or $X_{SD}$ value is determined) based on the (PMI) codebook type (e.g., which is configured via higher layer codebookType).

In one example, when the codebook type corresponds to a decoupled codebook (CB1), multiple CQI values (i.e., RRH-specific) are reported (the SD granularity can only be RRH-specific), and when the codebook type corresponds to a coupled/joint codebook (CB2), only one CQI value (i.e., RRH-common) is reported (the SD granularity can only be RRH-common). When RRH-specific, CQI values can be reported without any reference or w.r.t. a reference as described in one or more examples above.

In one example, when the codebook type corresponds to a decoupled codebook (CB1), one or multiple CQI values (i.e., RRH-specific) are reported (i.e., the SD granularity can be RRH-common or RRH-specific based on configuration), and when the codebook type corresponds to a coupled/joint codebook (CB2), only one CQI value (i.e., RRH-common) is reported (the SD granularity can only be RRH-common). When RRH-specific, CQI values can be reported without any reference or w.r.t. a reference as described in one or more examples above.

In one example, the decoupled codebook (CB1) corresponds to a codebook in which codebook components comprise:

Intra-TRP/RRH components: comprise separate components for antenna ports within each TRP/RRH (e.g., basis vectors, amplitude/phase coefficients for each TRP separately)

Inter-RRH components: comprise components for antenna ports across multiple TRPs/RRHs (e.g., inter-RRH amplitude/phase scaling for RRHs/TRPs)

In one example, CB1 is configured when the UE is configured with multiple CSI-RS resources (e.g., one per TRP).

In one example, there is no inter-RRH components (hence not reported). In one example, CB1 can be configured via a RRC parameter, e.g., CodebookMode=mode1. In one example, the CB1 codebook comprises components: (A) two separate basis matrices $W_1$, $W_f$ for SD and FD compression, respectively, and (B) coefficients $\tilde{W}_2$. In particular, the precoder for layer 1 is given by $$W_l = A_l C_l B_l^H = \frac{1}{\gamma} W_1 \tilde{W}_2 W_f^H = \frac{1}{\gamma} \begin{bmatrix} W_{1,1} \tilde{W}_{2,1} W_{f,1}^H \\ \vdots \\ W_{1,N} \tilde{W}_{2,N} W_{f,N}^H \end{bmatrix}$$

Here, $W_l$ is a $P_{CSIRS} \times N_3$ matrix whose columns are precoding vectors for $N_3$ FD units, $W_{1,r}$ is a block diagonal matrix $$\begin{bmatrix} B_r & 0 \\ 0 & B_r \end{bmatrix}$$

comprising 2 blocks that are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or $\tilde{W}_{2,r}$ is a $2L_r \times M_{\upsilon,r}$ coefficients matrix, and $W_{f,r}$ is a $N_3 \times M_{\upsilon,r}$ basis matrix for FD basis matrix (similar to Rel. 16 enhanced Type II codebook). The columns of $W_{f,r}$ comprises vectors $$g_{r,f,l} = \begin{bmatrix} y_{0,l}^{(r,f)} & y_{1,l}^{(r,f)} & \cdots & y_{N_3-1,l}^{(r,f)} \end{bmatrix}$$

or $$g_{f,l} = \begin{bmatrix} y_{0,l}^{(f,r)} & y_{1,l}^{(f,r)} & \cdots & y_{N_3-1,l}^{(f,r)} \end{bmatrix}, \text{ and}$$

$\gamma$ is a normalization factor.

In one example, the coupled codebook (CB2) corresponds to a codebook in which codebook components comprise at least one common/joint/coupled component across multiple TRPs/RRHs. For example, FD basis vectors can be common/joint across multiple TRPs/RRHs. In one example, CB2 is configured when the UE is configured with a single CSI-RS resource (e.g., one per TRP) which comprises subsets/groups of antenna ports, each subset/group corresponds to an RRH/TRP.

In one example, CB2 can be configured via a RRC parameter, e.g. CodebookMode=mode2. In one example, the CB2 codebook comprises components: (A) two separate basis matrices $W_1$, $W_f$ for SD and FD compression, respectively, and (B) coefficients $\tilde{W}_2$. In particular, the precoder for layer 1 is given by $$W_l = A_l C_l B_l^H = \frac{1}{\gamma} W_1 \tilde{W}_2 W_f^H$$

Here $W_l$ is a $P_{CSIRS} \times N_3$ matrix whose columns are precoding vectors for $N_3$ FD units, $W_1$ is a block diagonal matrix $$\begin{bmatrix} W_{1,1} & 0 & 0 & 0 \\ 0 & \ddots & 0 & 0 \\ 0 & 0 & & \\ 0 & 0 & & W_{1,2N} \end{bmatrix}$$

comprising 2N blocks, where $(2(r-1)+1,2r)$-th blocks are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or $\tilde{W}_2$ is a $2L \times M_{\upsilon}$ coefficients matrix, where $$L = \sum_{r=1}^{N} L_r,$$

and $W_f$ is a $N_3 \times M_{\upsilon}$ basis matrix for FD basis matrix (similar to Rel. 16 enhanced Type II codebook). The columns of $W_f$ comprises vectors $$g_{f,l} = \begin{bmatrix} y_{0,l}^{(f)} & y_{1,l}^{(f)} & \cdots & y_{N_3-1,l}^{(f)} \end{bmatrix},$$

and $\gamma$ is a normalization factor.

In various embodiments, one or multiple CQI values are reported across $N_{RRH} > 1$ TRPs/RRHs (i.e., the SD granularity or $X_{SD}$ value is determined) based on the non-PMI-feedback mode (e.g. which can be configured via higher layer non-PMI-Feedback-Mode). In one example, when non-PMI-Feedback-Mode=mode1, one CQI is reported across TRPs (e.g., one CQI for coherent joint transmission, CJT), and when non-PMI-Feedback-Mode=mode2, multiple CQIs are reported across TRPs (e.g. one CQI per TRP for non-coherent joint transmission, NCJT). In one example, a non-PMI-Feedback corresponds to the case wherein the CSI report includes (CRI, RI, CQI), and the precoding is either fixed (e.g., identity matrix) or precoding for each rank value is configured.

In one embodiment, a UE is configured to perform an TRP/RRH selection in which Z out of $N_{RRH}$ TRPs/RRHs are selected, where $1 \leq Z \leq N_{RRH}$, and one or multiple CQI values are reported accordingly based on the TRP/RRH selection hypothesis. In one example, the value of Z or/and indices of the selected TRPs is/are reported by the UE (e.g. via UCI part 1 of the two-part UCI). For instance, this reporting can be via a length $N_{RRH}$ bitmap, wherein a bit value '1' indicates section and a bit value '0' indicates no selection.

In one example, the codebook for CQI calculation (and CSI reporting) can be one of CB1 and CB2 described in one or more embodiments described herein. In this case, the codebook is used to report CSI for the selected Z TRPs. Note that when Z=1, the CSI corresponds to a single TRP (sTRP), and when Z>1, the CSI corresponds to multiple TRPs (mTRP). Hence, both sTRP CSI and mTRP CJT CSI can be supported in the same codebook (CB1 or CB2), and there can be dynamic switching between the two (i.e., sTRP and mTRP CSI). In one example, the term 'sTRP CSI' corresponds to (or is equivalent to) SPT CSI, and 'mTRP CSI' corresponds to (or is equivalent to) the NCJT CSI or CJT CSI.

In one example, the TRP/RRH selection is WB (i.e., the value of Z and/or the indices of the selected TRPs/RRHs are the same for all SBs in the CSI reporting band), hence the granularity (SD or FD) of CQI reporting remains the same across SBs.

In one example, the TRP/RRH selection is SB (i.e., the value of Z and/or the indices of the selected TRPs/RRHs can be the same or different across SBs in the CSI reporting band), hence the granularity (SD or FD) of CQI reporting may or may not remain the same across SBs.

For example, the SD granularity of CQI reporting can change across RRHs. For instance, Z=1 in one SB, implying one CQI value for one selected RRH, and Z=2 in another SB, implying one (e.g., RRH-common) or multiple CQI values (e.g., RRH-specific) for two selected RRHs.

In one embodiment, a UE is configured to perform an SB selection in which Y out of $N_{SB}$ SBs are selected, where $1 \leq Y \leq N_{SB}$, and one or multiple CQI values are reported accordingly based on the SB selection hypothesis.

In one example, the SB selection is RRH-common (i.e., the value of Y and/or the indices of the selected SBs are the same for all TRPs/RRHs), hence the granularity (SD or FD) of CQI reporting remains the same across TRPs/RRHs.

In one example, the SB selection is RRH-specific (i.e., the value of Y and/or the indices of the selected SBs can be the same or different across TRPs/RRHs), hence the granularity (SD or FD) of CQI reporting may or may not remain the same across TRPs/RRHs.

For example, the FD granularity of CQI reporting can change across TRPs/RRHs. For instance, Y=1 for one TRP/RRH, implying one CQI value for one selected SB, and Z=2 for another TRP/RRH, implying one (e.g., WB) or multiple CQI values (e.g., SB) for two selected SBs.

In one embodiment, a UE is configured to perform both an TRP/RRH selection and a SB selection in which Z out of $N_{RRH}$ TRPs/RRHs are selected and Y out of $N_{SB}$ SBs are selected, where $1 \leq Z \leq N_{RRH}$ and $1 \leq Y \leq N_{SB}$, and one or multiple CQI values are reported accordingly based on the TRP/RRH selection and the SB selection hypothesis.

In one example, the TRP/RRH selection is WB, and the SB selection are RRH-common (i.e., the value of Z and/or the indices of the selected TRPs/RRHs are the same for all SBs in the CSI reporting band, and the value of Y and/or the indices of the selected SBs are the same for all TRPs/RRHs), hence the granularity (SD or FD) of CQI reporting remains the same across selected SBs and TRPs/RRHs.

In one example, the TRP/RRH selection is WB, and the SB selection are RRH-specific (i.e., the value of Z and/or the indices of the selected TRPs/RRHs are the same for all SBs in the CSI reporting band, and the value of Y and/or the indices of the selected SBs can be the same or different across TRPs/RRHs).

In one example, the TRP/RRH selection is SB, and the SB selection are RRH-common (i.e., the value of Z and/or the indices of the selected TRPs/RRHs can be the same or different across SBs in the CSI reporting band, and the value of Y and/or the indices of the selected SBs are the same across TRPs/RRHs).

In one example, the TRP/RRH selection is SB, and the SB selection are RRH-specific (i.e., the value of Z and/or the indices of the selected TRPs/RRHs can be the same or different across SBs in the CSI reporting band, and the value of Y and/or the indices of the selected SBs can be the same or different across TRPs/RRHs).

In one embodiment, a UE is configured to report one or multiple CSI reports, where each CSI report includes components such as PMI, CQI, RI, (and possibly LI and/or CRI). For scheduling flexibility at gNB/NW, the UE can be configured to report multiple CSI reports.

In one example, a UE is configured with 2 reports, one assuming a single RRH/TRP selection (the best TRP/RRH among the multiple RRHs, i.e., TRP selection) and another assuming multiple RRHs/TRPs (e.g., $N_{RRH}>1$ RRHs/TRPs) assuming CJT or NCJT across multiple TRPs.

In one example, a UE is configured with $N_{RRH}$ independent reports, one for each RRH/TRP.

In one example, a UE is configured with 1 report across $N_{RRH}$ TRPs, wherein one component (e.g., CQI) can be reported assuming both single TRP selection and CJT/NCJT across multiple TRPs. When the component is CQI, two CQIs are reported, where there second CQI value can be reported differentially w.r.t. the first CQI value). The rest of the components (e.g., PMI, RI, and possibly LI and CRI) are reported assuming CJT/NCJT across multiple TRPs.

In one example, a UE is configured with 3 reports, one assuming a single RRH/TRP selection (the best TRP/RRH among the multiple RRHs, i.e., TRP selection), the second assuming multiple RRHs/TRPs (e.g., $N_{RRH}>1$ RRHs/TRPs) assuming NCJT across multiple TRPs, and the third assuming multiple RRHs/TRPs (e.g., $N_{RRH}>1$ RRHs/TRPs) assuming CJT across multiple TRPs.

In one example, a UE is configured with a CSI reporting mode (e.g., via higher layer), where the CSI reporting mode is one of the following.

In one example, the CSI reporting mode corresponds to a single TRP/RRH selection, wherein one (e.g., the best) TRP/RRH among the multiple RRHs is selected, and the CSI report includes components for the selected TRP. In one example, the UE can also be configured with a value of S=number of sTRP CSIs (e.g. via a higher layer parameter). When S=1, the UE reports sTRP CSI for one TRP. When S=2, the UE reports 2 sTRP CSI, one for each of the 2 TRPs, and so on. The selected S TRPs (indices) can be reported (e.g. via CRI or a new indicator) in UCI part 1 of a two-part UCI.

In one example, the CSI reporting mode corresponds to NCJT across multiple TRPs, wherein the CSI report includes components assuming NCJT across multiple TRPs. In this case, the UE may also perform Z>1 TRP selection from $N_{RRH}$ TRPs, and report the NCJT CSI for the selected TRPs. In a variation, the UE may also perform Z=1 or Z>1 TRP selection from $N_{RRH}$ TRPs, and report the sTRP CSI when Z=1, and NCJT CSI for the selected Z>1 TRPs.

In one example, the CSI reporting mode corresponds to CJT across multiple TRPs, wherein the CSI report includes components assuming CJT across multiple TRPs. In this case, the UE may also perform Z>1 TRP selection from $N_{RRH}$ TRPs, and report the CJT CSI for the selected TRPs. In a variation, the UE may also perform Z=1 or Z>1 TRP selection from $N_{RRH}$ TRPs, and report the sTRP CSI when Z=1, and CJT CSI for the selected Z>1 TRPs.

In one example, the CSI reporting mode corresponds to including CSI components for both single TRP/RRH selection and NCJT across multiple TRPs. In this case, the UE may also perform Z>1 TRP selection from $N_{RRH}$ TRPs, and report the NCJT CSI for the selected TRPs. The UE can also report S≥1 sTRP CSI(s) as described above.

In one example, the CSI reporting mode corresponds to including CSI components for both single TRP/RRH selection and CJT across multiple TRPs. In this case, the UE may also perform Z>1 TRP selection from $N_{RRH}$ TRPs, and report the CJT CSI for the selected TRPs. The UE can also report S≥1 sTRP CSI(s) as described above.

In one example, the CSI reporting mode corresponds to including CSI components for both NCJT across multiple TRPs and CJT across multiple TRPs. In this case, the UE may also perform Z>1 TRP selection from $N_{RRH}$ TRPs, and report the CJT/NCJT CSI for the selected TRPs.

In one example, the CSI reporting mode corresponds to including CSI components for (A) single TRP/RRH selection, (B) NCJT across multiple TRPs, and (C) CJT across multiple TRPs. In this case, the UE may also perform Z>1 TRP selection from $N_{RRH}$ TRPs, and report the CJT/NCJT CSI for the selected TRPs. The UE can also report S≥1 sTRP CSI(s) as described above.

In one example, the CSI reporting mode corresponds to including CSI components for one of (A) single TRP/RRH selection and (B) NCJT across multiple TRPs. In this case, the UE selects and reports one of (A) and (B), e.g. this selection can be reported via CRI or a new indicator (via UCI part 1 of a two-part UCI). In this case, for (B), the UE may also perform Z>1 TRP selection from $N_{RRH}$ TRPs, and report the NCJT CSI for the selected TRPs. The UE can also report S≥1 sTRP CSI(s) as described above.

In one example, the CSI reporting mode corresponds to including CSI components for one of (A) single TRP/RRH selection and (C) CJT across multiple TRPs. In this case, the UE selects and reports one of (A) and (C), e.g. this selection can be reported via CRI or a new indicator (via UCI part 1 of a two-part UCI). In this case, for (B), the UE may also perform Z>1 TRP selection from $N_{RRH}$ TRPs, and report the CJT CSI for the selected TRPs. The UE can also report S≥1 sTRP CSI(s) as described above.

In one example, the CSI reporting mode corresponds to including CSI components for one of (B) NCJT across multiple TRPs and (C) CJT across multiple TRPs. In this case, the UE selects and reports one of (B) and (C), e.g. this selection can be reported via CRI or a new indicator (via UCI part 1 of a two-part UCI). In this case, the UE may also perform Z>1 TRP selection from $N_{RRH}$ TRPs, and report the CJT/NCJT CSI for the selected TRPs. The UE can also report S≥1 sTRP CSI(s) as described above.

In one example, the CSI reporting mode corresponds to including CSI components for one of (A) single TRP/RRH selection, (B) NCJT across multiple TRPs, and (C) CJT across multiple TRPs. In this case, the UE selects and reports one of (A), (B) and (C), e.g. this selection can be reported via CRI or a new indicator (via UCI part 1 of a two-part UCI). In this case, for (B) or (C) the UE may also perform Z>1 TRP selection from $N_{RRH}$ TRPs, and report the CJT/NCJT CSI for the selected TRPs. The UE can also report S≥1 sTRP CSI(s) as described above.

In one example, a UE is configured with a CSI reporting mode (e.g. via higher layer), where the CSI reporting mode is according to at least one of the examples in one or more examples described herein. In addition, the configured CSI report mode is triggered/activated for reporting via an activation command in a MAC CE.

In one example, a UE is configured with a CSI reporting mode (e.g. via higher layer), where the CSI reporting mode is according to at least one of the examples in one or more examples described herein. In addition, the configured CSI report mode is triggered for reporting via a code point of a DCI field in a DCI. For example, the DCI field can be a CSI request field.

In one embodiment, a UE is configured to report CSI components such as PMI, CQI, RI, (and possibly LI and/or CRI), where at least one of the components is reported assuming two different CSI hypothesis (e.g., single TRP/RRH selection and CJT/NCJT across multiple TRPs), i.e., two values are reported for the at least one component.

In one example, (PMI, RI and possibly LI and CRI) assuming one hypothesis (CJT/NCJT across multiple TRPs), and CQI assuming both hypotheses (e.g., single TRP/RRH selection and CJT/NCJT across multiple TRPs). Here, the second CQI (first hypothesis) can be reported differentially w.r.t. the first CQI value (second hypothesis).

In one example, (PMI, RI and possibly LI and CRI) assuming one hypothesis (single TRP/RRH selection), and CQI assuming both hypotheses (e.g., single TRP/RRH selection and CJT/NCJT across multiple TRPs). Here, the second CQI (first hypothesis) can be reported differentially w.r.t. the first CQI value (second hypothesis).

In one example, (PMI, RI and possibly LI and CRI) assuming one hypothesis (one/best of single TRP/RRH selection and CJT/NCJT across multiple TRPs), and CQI assuming both hypotheses (e.g. single TRP/RRH selection and CJT/NCJT across multiple TRPs). Here, the second CQI (first hypothesis) can be reported differentially w.r.t. the first CQI value (second hypothesis).

In one example, (CQI, RI and possibly LI and CRI) assuming one hypothesis (CJT/NCJT across multiple TRPs), and PMI assuming both hypotheses (e.g., single TRP/RRH selection and CJT/NCJT across multiple TRPs).

In one example, (CQI, RI and possibly LI and CRI) assuming one hypothesis (single TRP/RRH selection), and PMI assuming both hypotheses (e.g., single TRP/RRH selection and CJT/NCJT across multiple TRPs).

In one example, (CQI, RI and possibly LI and CRI) assuming one hypothesis (one/best of single TRP/RRH selection and CJT/NCJT across multiple TRPs), and PMI assuming both hypotheses (e.g. single TRP/RRH selection and CJT/NCJT across multiple TRPs).

In one example, (RI and possibly LI and CRI) assuming one hypothesis (CJT/NCJT across multiple TRPs), and (PMI, CQI) assuming both hypotheses (e.g., single TRP/RRH selection and CJT/NCJT across multiple TRPs). Here, the second CQI (first hypothesis) can be reported differentially w.r.t. the first CQI value (second hypothesis).

In one example, (RI and possibly LI and CRI) assuming one hypothesis (single TRP/RRH selection), and (PMI, CQI) assuming both hypotheses (e.g., single TRP/RRH selection and CJT/NCJT across multiple TRPs). Here, the second CQI (first hypothesis) can be reported differentially w.r.t. the first CQI value (second hypothesis).

In one example, (RI and possibly LI and CRI) assuming one hypothesis (one/best of single TRP/RRH selection and CJT/NCJT across multiple TRPs), and (PMI, CQI) assuming both hypotheses (e.g. single TRP/RRH selection and CJT/NCJT across multiple TRPs). Here, the second CQI (first hypothesis) can be reported differentially w.r.t. the first CQI value (second hypothesis).

In one embodiment, a UE is configured to report CSI components such as PMI, CQI, RI, (and possibly LI or/and CRI), where at least one of the components is reported assuming three different CSI hypothesis (e.g., single TRP/RRH selection, NCJT across multiple TRPs, and CJT across multiple TRPs), i.e., three values are reported for the at least one component.

In one example, (PMI, RI and possibly LI and CRI) assuming one hypothesis (one/best of single TRP/RRH selection, NCJT across multiple TRPs, and CJT across multiple TRPs), and CQI assuming three hypotheses (e.g., single TRP/RRH selection, NCJT across multiple TRPs, and CJT across multiple TRPs). Here, the second CQI (first hypothesis) or/and the third CQI can be reported differentially w.r.t. the first CQI value (second hypothesis).

In one example, (CQI, RI and possibly LI and CRI) assuming one hypothesis (one/best of single TRP/RRH selection, NCJT across multiple TRPs, and CJT across multiple TRPs), and PMI assuming three hypotheses (e.g. single TRP/RRH selection, NCJT across multiple TRPs, and CJT across multiple TRPs).

In one example, (RI and possibly LI and CRI) assuming one hypothesis (one/best of single TRP/RRH selection, NCJT across multiple TRPs, and CJT across multiple TRPs), and (PMI, CQI) assuming three hypotheses (e.g. single TRP/RRH selection, NCJT across multiple TRPs, and CJT across multiple TRPs). Here, the second CQI (first hypothesis) or/and the third CQI can be reported differentially w.r.t. the first CQI value (second hypothesis).

In one embodiment, a UE is configured to report CSI components for non-selected RRHs/TRPs, where the UE is configured to perform TRP selection. That is, the UE selects Z out of $N_{RRH}$ TRPs, determines CSI components for the Z selected TRPs, and in addition, also determines CSI components for the $N_{RRH}-Z$ non-selected TRPs. The reporting of the components for the non-selected TRPs can be via a separate report or together with the CSI report for the selected TRPs.

In one example, when all RRHs are selected ($Z=N_{RRH}$), only CQI is reported. However, when a subset of RRHs is selected ($Z<N_{RRH}$), CQI is reported for the selected RRHs, and additional information/components about the non-selected RRHs can also be reported.

In one example, the addition information indicates power/amplitude level(s) for all or a subset of the non-selected RRHs.

In one example, the addition information indicates a strongest RRH among the non-selected RRHs.

In one example, when $N_{RRH}-Z>1$, the addition information indicates a strongest RRH among the non-selected RRHs, and power/amplitude level(s) for the $N_{RRH}-Z-1$ RRHs (excluding the strongest RRH), whose amplitude/power can be fixed, e.g., to 1).

In one embodiment, a UE is configured with a CSI reporting (e.g., via higher layer CSI-ReportConfig that includes a parameter reportQuantity that provides a content of the CSI report where the content includes CQI for $N_{RRH}>1$ RRHs/TRPs or $N_{RRH}\geq 1$ RRHs/TRPs, wherein the CSI report includes Doppler domain (DD) or time domain (TD) components (e.g., DD/TD basis vectors in addition to SD and/or FD basis vectors, and/or amplitude/phase coefficients across multiple DD/TT units). The CSI report is based on a channel (NZP CSI-RS resource(s)) measurement from mTRPs (and interference measurement).

Figure 15B:
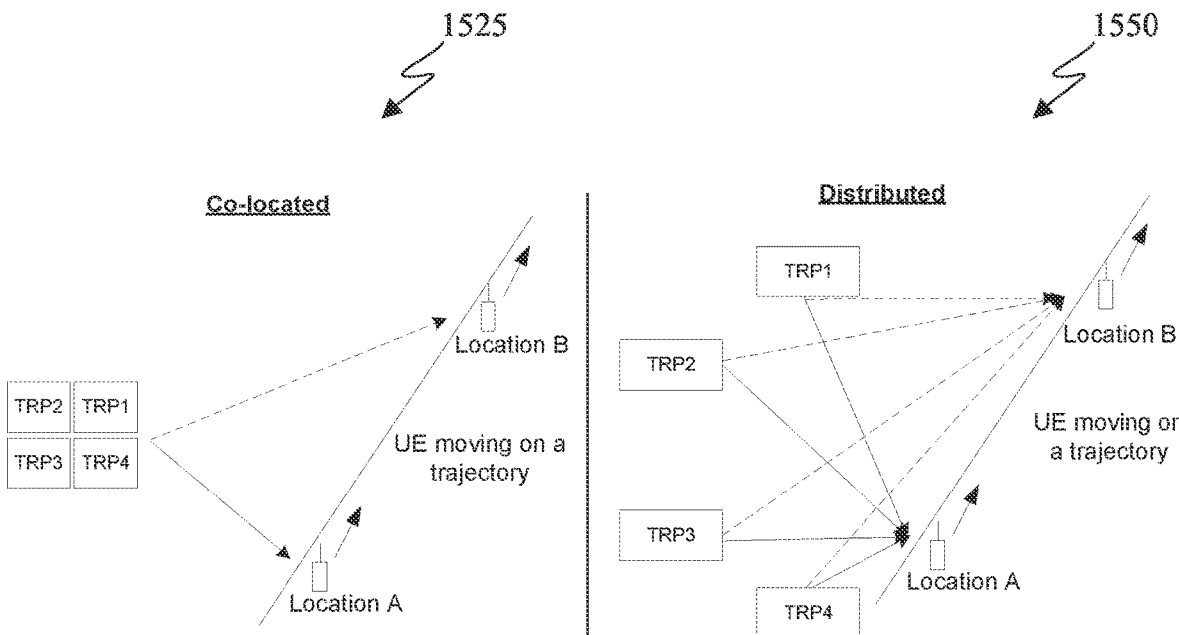
FIG. 15B illustrates co-located and distributed TRPs serving a moving UE according to embodiments of the present disclosure.

FIG. 15B illustrates co-located and distributed TRPs serving a moving UE according to embodiments of the present disclosure. The embodiment of the co-located and distributed TRPs serving a moving UE illustrated in FIG. 15B is for illustration only. FIG. 15B does not limit the scope of this disclosure to any particular implementation of co-located and distributed TRPs serving a moving UE.

In one example scenario, multiple TRPs can be co-located (multiple TRPs 1525) or distributed (multiple TRPs 1550), and can serve static (non-mobile) or moving UEs. An illustration of TRPs serving a moving UE is shown in FIG. 15B. While the UE moves from a location A to another location B, the UE measures the channel, e.g., via NZP CSI-RS resources, (may also measure the interference, e.g., via CSI-IM resources or CSI-RS resources for interference measurement), uses the measurement to determine/report CSI considering single TRP transmission or joint transmission from multiple TRPs. The reported CSI can be based on a codebook. The codebook can include components considering multiple TRPs (e.g., SDF basis vectors), and frequency/delay-domain channel profile (e.g. FD basis vectors) and time/Doppler-domain channel profile (e.g. DD/TD basis vectors).

The channel measurement can be based on $K\geq 1$ channel measurement resources (CMRs) that are transmitted from a plurality of CSI-RS antenna ports (associated with mTRPs), and are measured via a plurality of frequency-domain (FD) units (e.g., a FD unit=one or more PRBs/SBs) and via either a time-domain (TD) unit or a plurality of TD units (e.g. a TD unit=one or more time slots). In one example, a CMR can be a NZP-CSI-RS resource.

The CSI report can be associated with the plurality of FD units and the plurality of TD units associated with the channel measurement. Alternatively, the CSI report can be associated with a second set of FD units (different from the plurality of FD units associated with the channel measurement) or/and a second set of TD units (different from the plurality of TD units associated with the channel measurement). In this later case, the UE, based on the channel measurement, can perform prediction (interpolation or extrapolation) in the second set of FD units or/and the second set of TD units associated with the CSI report.

In one example, at least one of the following examples is used/configured regarding the DD/TD granularity of CQI reporting across DD/TD units.

In one example, the DD/TD granularity is wide-time (WT), i.e., one CQI value is reported for all DD/TD units (e.g., within a CSI-RS measurement window).

In one example, the DD/TD granularity is sub-time (ST), i.e., one CQI value is reported for each ST.

In one example, the DD/TD granularity is WT+ST (differential reporting) or ST w.r.t. a WT reference value. That is, one WT CQI value is reported, and one differential ST CQI value is reported for each ST, where each differential CQI value is w.r.t. the WT CQI value.

In one example, the number of CQIs across DD/TD units (denote as $X_{DD}$) is configured. When $X_{DD}=1$, the CQI across DD/TD units is according to one or more examples described herein. When $X_{DD}>1$, the CQI across TD/DD units is according to one or more examples described herein.

In one example, at least one of the following examples is used/configured regarding the FD granularity of CQI reporting across SBs (within the CSI reporting band) and the DD/TD granularity of CQI reporting across DD/TD units.

In one example, the FD and TD/DD granularities are separate. The details are analogous to one or more examples described above except that SD is replaced with TD/DD.

In one example, the FD and TD/DD granularities are joint across SBs and DD/TD units. The details are analogous to one or more examples described above except that SD is replaced with TD/DD.

In one example, at least one of the following examples is used/configured regarding the SD granularity of CQI reporting across TRPs and the DD/TD granularity of CQI reporting across DD/TD units.

In one example, the SD and TD/DD granularities are separate. The details are analogous to one or mor examples described above except that FD is replaced with TD/DD.

In one example, the SD and TD/DD granularities are joint across TRPs and DD/TD units. The details are analogous to one or more examples described above except that FD is replaced with TD/DD.

In one example, at least one of the following examples is used/configured regarding the FD granularity of CQI reporting across SBs (within the CSI reporting band), the SD granularity of CQI reporting across TRPs, and the DD/TD granularity of CQI reporting across DD/TD units.

In one example, the FD, SD, and TD/DD granularities are separate. The details are analogous to examples described in this disclosure.

In one example, the FD, SD, and TD/DD granularities are joint across SBs, TRPs, and DD/TD units. The details are analogous to examples described in this disclosure.

In one example, the SD and TD/DD granularities are joint across TRPs, and DD/TD units, and the FD granularity is separate. The details are analogous to examples described in this disclosure.

In one example, the FD and TD/DD granularities are joint across SBs, and DD/TD units, and the SD granularity is separate. The details are analogous to examples described in this disclosure.

In one example, the SD and FD granularities are joint across TRPs, and SBs, and the TD/DD granularity is separate. The details are analogous to examples described in this disclosure.

In one embodiment, one or multiple CQI values are reported across $N_{RRH}>1$ TRPs/RRHs (i.e., the SD granularity or $X_{SD}$ value is determined) based on the (PMI) codebook type (e.g. which is configured via higher layer codebookType). The codebook type can be decoupled (CB1) or coupled (CB2), as described in one or more embodiments described herein, except that the codebook also includes a DD/TD basis for DD/TD compression.

In one embodiment, a UE is configured to perform an TRP/RRH selection in which Z out of $N_{RRH}$ TRPs/RRHs are selected, where $1 \le Z \le N_{RRH}$, and one or multiple CQI values are reported accordingly based on the TRP/RRH selection hypothesis. In one example, the value of Z or/and indices of the selected TRPs is/are reported by the UE (e.g., via UCI part 1 of the two-part UCI). For instance, this reporting can be via a length $N_{RRH}$ bitmap, wherein a bit value '1' indicates section and a bit value '0' indicates no selection. The rest of the details of TRP selection analogous to one or more embodiments described herein, except that the codebook also includes a DD/TD basis for DD/TD compression.

In one embodiment, a UE is configured to report one or multiple CSI reports, where each CSI report includes components such as PMI, CQI, RI, (and possibly LI or/and CRI). For scheduling flexibility at gNB/NW, the UE can be configured to report multiple CSI reports. The rest of the details of TRP selection analogous to one or more embodiments described herein, except that the codebook also includes a DD/TD basis for DD/TD compression.

In one embodiment, a UE is configured to report CSI components such as PMI, CQI, RI, (and possibly LI or/and CRI), where at least one of the components is reported assuming two different CSI hypothesis (e.g., single TRP/RRH selection and CJT/NCJT across multiple TRPs), i.e., two values are reported for the at least one component. The rest of the details of TRP selection analogous to one or more embodiments described herein, except that the codebook also includes a DD/TD basis for DD/TD compression.

In one embodiment, a UE is configured to report CSI components such as PMI, CQI, RI, (and possibly LI or/and CRI), where at least one of the components is reported assuming three different CSI hypothesis (e.g., single TRP/RRH selection, NCJT across multiple TRPs, and CJT across multiple TRPs), i.e., three values are reported for the at least one component. The rest of the details of TRP selection analogous to one or more embodiments described herein, except that the codebook also includes a DD/TD basis for DD/TD compression.

Figure 16:
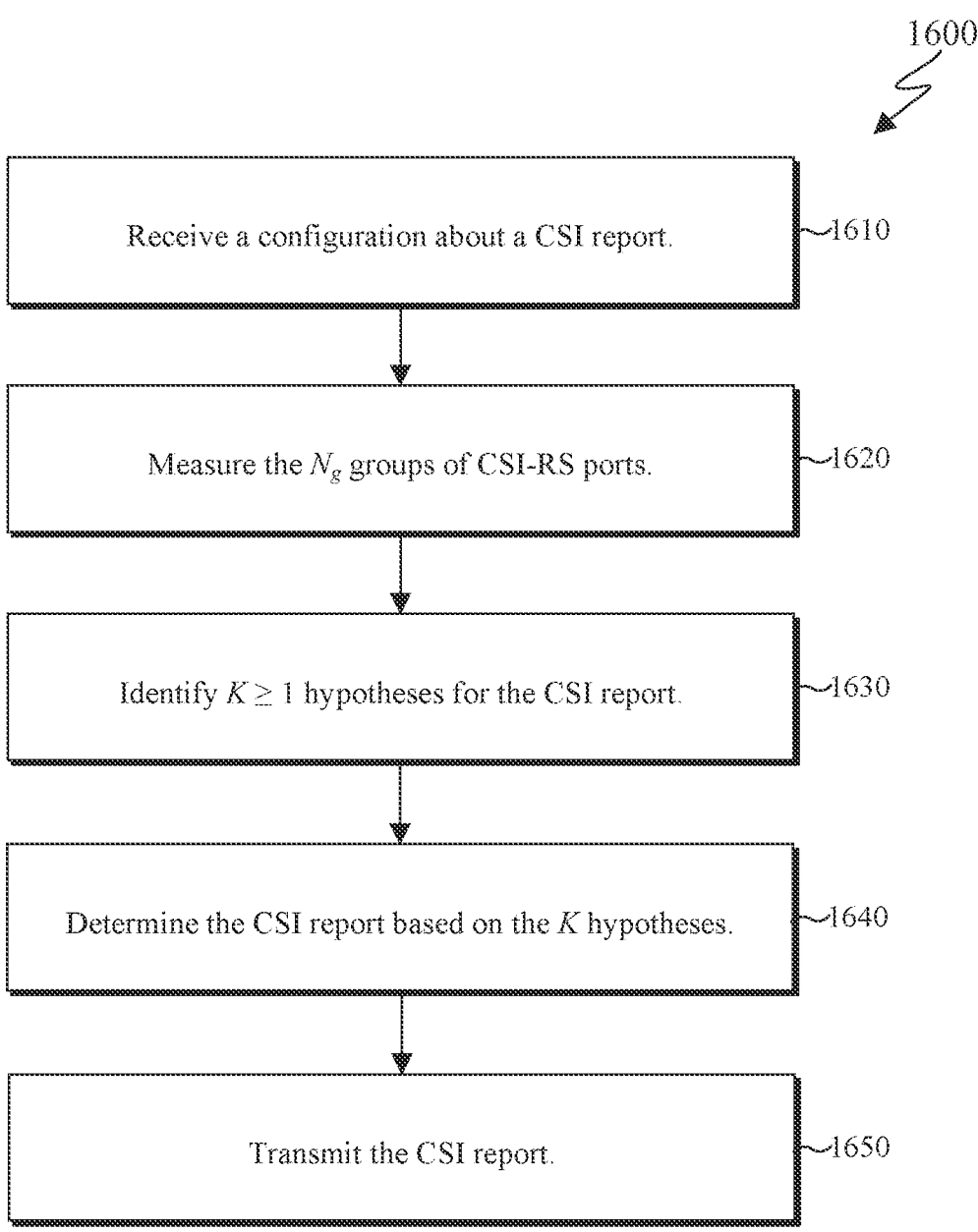
FIG. 16 illustrates a flowchart of a method for channel quality reporting according to embodiments of the present disclosure.

FIG. 16 illustrates a flowchart of a method 1600 for channel quality reporting according to embodiments of the present disclosure. The steps of the method 1600 of FIG. 16 can be performed by any of the UEs 111-116 of FIG. 1, such as the UE 116 of FIG. 3 and a corresponding method can be performed by a BS, such as BS 102 in FIG. 2. The method 1600 is for illustration only and other embodiments can be used without departing from the scope of the present disclosure.

The method begins with the UE receiving a configuration about a CSI report (step 1610). For example, in step 1610, the configuration includes information about $N_g>1$ groups of CSI-RS ports. In various embodiments, each of the $N_g$ groups of CSI-RS ports is associated with a respective NZP CSI-RS resource. In various embodiments, the configuration includes information about a codebook, the codebook includes a first component and a second component, the first component includes P≥2 sets of basis vectors including a first set for SD and a second set for FD, the second component includes coefficients associated with each basis vector combination $(v_1, v_2, \ldots, v_P)$, where $v_k$ belongs to a k-th set of basis vectors and k=1, . . . , P, and the CSI report includes one or multiple basis vector indicators indicating all or a portion of the first component and one of multiple coefficient indicators indicating all or a portion of the second component. For example, when P=3, the first component corresponds to 3 sets of basis vectors: the first set for SD, the second set for FD, and a third set for DD/TD, and the second component corresponds to coefficients associated with each basis vector triple $(v_1, v_2, v_3) = (a_i, b_f, c_d)$, where $a_i$ is an i-th basis vector from the first set, $b_f$ is a f-th basis vector from the second set, and $c_d$ is a d-th basis vector from the third set. In various embodiments, a number of CSI-RS ports is the same in all of the $N_g$ groups or a number of CSI-RS ports in at least one of the $N_g$ groups is different from number of CSI-RS ports in others of the $N_g$ groups.

The UE then measures the $N_g$ groups of CSI-RS ports (step 1620). The UE then identifies K≥1 hypotheses for the CSI report (step 1630). For example, in step 1630, each of the K hypotheses corresponds to one of a SPT, a NCJT, or a CJT, where SPT corresponds to a CSI for one of the $N_g$ groups of CSI-RS ports, NCJT corresponds to the CSI across a multiple of the $N_g$ groups of CSI-RS ports such that one group is used for a layer, and CJT corresponds to the CSI across the multiple of the $N_g$ groups of CSI-RS ports such that the multiple groups are used for the layer. In various embodiments, to identify the K hypotheses, the UE selects the K hypotheses from a SPT, a NCJT, or a CJT and the CSI report includes at least one indicator indicating the selected K hypotheses. In various embodiments, the UE receives information about the K hypotheses via the configuration, a MAC-CE, or DCI and identifies the K hypotheses based on the received information.

The UE then determines the CSI report based on the K hypotheses (step 1640). For example, in step 1640, the UE may select Z out of the $N_g$ groups and determine the CSI report for the selected Z groups, where the CSI report includes at least one indicator indicating the selected Z groups. In various embodiments, when K>1, the CSI report includes I≥1 indicators from a CRI, a LI, a RI, a PMI, or a CQI. For example, the I indicators are for each of the K hypotheses or at least one of the I indicators is for each of the K hypotheses and remaining ones of the I indicators are for one of the K hypotheses. The UE then transmits the CSI report (step 1650). For example, in step 1650, the CSI report corresponds to υ≥1 layers.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive a configuration about a channel state information (CSI) report, the configuration including information about $N_g > 1$ groups of CSI reference signal (CSI-RS) ports; and
a processor operably coupled to the transceiver, the processor, based on the configuration, configured to:
measure the $N_g$ groups of CSI-RS ports,
identify K≥1 hypotheses for the CSI report, and
determine the CSI report based on the K hypotheses,
wherein:
the transceiver is further configured to transmit the CSI report, the CSI report corresponds to υ≥1 layers,
the configuration includes information about a codebook,
the codebook includes a first component and a second component,
the first component includes P≥2 sets of basis vectors including a first set for spatial domain (SD) and a second set for frequency domain (FD),
the second component includes coefficients associated with each basis vector combination $(v_1, v_2, \ldots, v_P)$, where $v_k$ belongs to a k-th set of basis vectors and k=1, . . . , P, and
the CSI report includes one or multiple basis vector indicators indicating all or a portion of the first component and one of multiple coefficient indicators indicating all or a portion of the second component.

2. The UE of claim 1, wherein the K hypotheses correspond to a same transmission which is one of a single point transmission (SPT), a non-coherent joint transmission (NCJT), or a coherent joint transmission (CJT), where:
SPT corresponds to a CSI for one of the $N_g$ groups of CSI-RS ports,
NCJT corresponds to a CSI across a multiple of the $N_g$ groups of CSI-RS ports such that one group is used for each layer, and
CJT corresponds to a CSI across the multiple of the $N_g$ groups of CSI-RS ports such that the multiple groups are used for each layer.

3. The UE of claim 1, wherein each of the $N_g$ groups of CSI-RS ports is associated with a respective non-zero power (NZP) CSI-RS resource.

4. The UE of claim 1, wherein:
to identify the K hypotheses, the processor is further configured to select the K hypotheses from a single point transmission (SPT), a non-coherent joint transmission (NCJT), or a coherent joint transmission (CJT), and the CSI report includes at least one indicator indicating the selected K hypotheses.

5. The UE of claim 1, wherein:

the transceiver is further configured to receive information about the K hypotheses via the configuration, a medium access control-control element (MAC-CE), or a downlink control information (DCI), and the processor is further configured to identify the K hypotheses based on the received information.

6. The UE of claim 1, wherein:

the processor is further configured to:

select Z out of the $N_g$ groups, where Z is more than one, and determine the CSI report for the selected Z groups, and the CSI report includes at least one indicator indicating the selected Z groups.

7. The UE of claim 1, wherein:

when K>1, the CSI report includes I≥1 indicators from a CSI-RS resource indicator (CRI), a layer indicator (LI), a rank indicator (RI), a precoding matrix indicator (PMI), or a channel quality indicator (CQI), and (i) the I indicators are for each of the K hypotheses or (ii) at least one of the I indicators is for each of the K hypotheses and remaining ones of the I indicators are for one of the K hypotheses.

8. The UE of claim 1, wherein, when P=3:

the first component corresponds to 3 sets of basis vectors:

the first set for SD, the second set for FD, and a third set for Doppler or time domain (DD/TD), and the second component corresponds to coefficients associated with each basis vector triple $(v_1, v_2, v_3)=(a_i, b_f, c_d)$, where $a_i$ is an i-th basis vector from the first set, $b_f$ is a f-th basis vector from the second set, and $c_d$ is a d-th basis vector from the third set.

9. The UE of claim 1, wherein a number of CSI-RS ports is the same in all of the $N_g$ groups or a number of CSI-RS ports in at least one of the $N_g$ groups is different from number of CSI-RS ports in others of the $N_g$ groups.

10. A base station (BS) comprising:

a processor configured to generate a configuration about a channel state information (CSI) report, the configuration including information about $N_g$>1 groups of CSI reference signal (CSI-RS) ports; and a transceiver operably coupled to the processor, the transceiver configured to:

transmit the configuration, transmit CSI-RS on the $N_g$ groups of CSI-RS ports, and receive the CSI report, wherein:

the CSI report corresponds to υ≥1 layers and is based on K≥1 hypotheses, the configuration includes information about a codebook, the codebook includes a first component and a second component, the first component includes P≥2 sets of basis vectors including a first set for spatial domain (SD) and a second set for frequency domain (FD), the second component includes coefficients associated with each basis vector combination $(v_1, v_2, \ldots, v_P)$, where $v_k$ belongs to a k-th set of basis vectors and k=1, . . . , P, and the CSI report includes one or multiple basis vector indicators indicating all or a portion of the first component and one of multiple coefficient indicators indicating all or a portion of the second component.

11. The BS of claim 10, wherein the K hypotheses correspond to a same transmission which is one of a single point transmission (SPT), a non-coherent joint transmission (NCJT), or a coherent joint transmission (CJT), where:

SPT corresponds to a CSI for one of the $N_g$ groups of CSI-RS ports,

NCJT corresponds to a CSI across a multiple of the $N_g$ groups of CSI-RS ports such that one group is used for each layer, and CJT corresponds to a CSI across the multiple of the $N_g$ groups of CSI-RS ports such that the multiple groups are used for each layer.

12. The BS of claim 10, wherein each of the $N_g$ groups of CSI-RS ports is associated with a respective non-zero power (NZP) CSI-RS resource.

13. The BS of claim 10, wherein:

the K hypotheses correspond to a single point transmission (SPT), a non-coherent joint transmission (NCJT), or a coherent joint transmission (CJT), and the CSI report includes at least one indicator indicating the K hypotheses.

14. The BS of claim 10, wherein the transceiver is further configured to transmit information about the K hypotheses via the configuration, a medium access control-control element (MAC-CE), or a downlink control information (DCI) to indicate the K hypotheses.

15. A method for operating a user equipment (UE), the method comprising:

receiving a configuration about a channel state information (CSI) report, the configuration including information about $N_g$>1 groups of CSI reference signal (CSI-RS) ports;

based on the configuration:

measuring the $N_g$ groups of CSI-RS ports;

identifying K≥1 hypotheses for the CSI report; and determining the CSI report based on the K hypotheses; and transmitting the CSI report, wherein:

the CSI report corresponds to υ≥1 layers, the configuration includes information about a codebook, the codebook includes a first component and a second component, the first component includes P≥2 sets of basis vectors including a first set for spatial domain (SD) and a second set for frequency domain (FD), the second component includes coefficients associated with each basis vector combination $(v_1, v_2, \ldots, v_P)$, where $v_k$ belongs to a k-th set of basis vectors and k=1, . . . , P, and the CSI report includes one or multiple basis vector indicators indicating all or a portion of the first component and one of multiple coefficient indicators indicating all or a portion of the second component.

16. The method of claim 15, wherein the K hypotheses correspond to a same transmission which is one of a single point transmission (SPT), a non-coherent joint transmission (NCJT), or a coherent joint transmission (CJT), where:

SPT corresponds to a CSI for one of the $N_g$ groups of CSI-RS ports,

NCJT corresponds to a CSI across a multiple of the $N_g$ groups of CSI-RS ports such that one group is used for each layer, and CJT corresponds to a CSI across the multiple of the $N_g$ groups of CSI-RS ports such that the multiple groups are used for each layer.

17. The method of claim 15, wherein each of the $N_g$ groups of CSI-RS ports is associated with a respective non-zero power (NZP) CSI-RS resource.

18. The method of claim 15, wherein:

identifying the K hypotheses comprises selecting the K hypotheses from a single point transmission (SPT), a non-coherent joint transmission (NCJT), or a coherent joint transmission (CJT), and the CSI report includes at least one indicator indicating the selected K hypotheses.

19. The method of claim 15, further comprising:

receiving information about the K hypotheses via the configuration, a medium access control-control element (MAC-CE), or a downlink control information (DCI), wherein identifying the K hypotheses comprises identifying the K hypotheses based on the received information.

* * * * *